United States Patent
Zitnick, III et al.

(10) Patent No.: US 7,522,749 B2
(45) Date of Patent: Apr. 21, 2009

(54) SIMULTANEOUS OPTICAL FLOW ESTIMATION AND IMAGE SEGMENTATION

(75) Inventors: Charles Zitnick, III, Seattle, WA (US); Sing Bing Kang, Redmond, WA (US); Nebojsa Jojic, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 423 days.

(21) Appl. No.: 11/193,273

(22) Filed: Jul. 30, 2005

(65) Prior Publication Data
US 2006/0228002 A1    Oct. 12, 2006

Related U.S. Application Data

(60) Provisional application No. 60/669,675, filed on Apr. 8, 2005.

(51) Int. Cl.
*G06K 9/00*    (2006.01)
(52) U.S. Cl. ................. 382/107; 382/103; 382/164; 382/173
(58) Field of Classification Search ............. 382/103, 382/107, 162, 164, 173; 348/699
See application file for complete search history.

(56) References Cited

U.S. PATENT DOCUMENTS

| | | | | |
|---|---|---|---|---|
| 5,594,504 | A | * | 1/1997 | Ebrahimi .................. 348/699 |
| 5,748,761 | A | * | 5/1998 | Chang et al. ............... 382/107 |
| 5,929,940 | A | * | 7/1999 | Jeannin .................... 348/699 |
| 6,005,625 | A | * | 12/1999 | Yokoyama ................ 348/699 |
| 6,008,865 | A | * | 12/1999 | Fogel ...................... 382/236 |
| 6,049,619 | A | * | 4/2000 | Anandan et al. ........... 382/103 |
| 6,385,245 | B1 | * | 5/2002 | De Haan et al. ......... 375/240.16 |
| 6,542,639 | B2 | * | 4/2003 | Konoshima et al. ........ 382/164 |
| 6,766,037 | B1 | * | 7/2004 | Le et al. .................. 382/107 |

(Continued)

FOREIGN PATENT DOCUMENTS

EP    579319 A2 *    1/1994

OTHER PUBLICATIONS

Michael G. Ross, "Exploiting Texture-Motion Duality in Optical Flow and Image Segmentation", Aug. 2000, Massachusetts Institute of Technology, pp. 33-46.*

(Continued)

*Primary Examiner*—Vikkram Bali
*Assistant Examiner*—Daniel Zeilberger
(74) *Attorney, Agent, or Firm*—Lyon & Harr, LLP; Richard T. Lyon

(57) ABSTRACT

A technique for estimating the optical flow between images of a scene and a segmentation of the images is presented. This involves first establishing an initial segmentation of the images and an initial optical flow estimate for each segment of each images and its neighboring image or images. A refined optical flow estimate is computed for each segment of each image from the initial segmentation of that image and the initial optical flow of the segments of that image. Next, the segmentation of each image is refined from the last-computed optical flow estimates for each segment of the image. This process can continue in an iterative manner by further refining the optical flow estimates for the images using their respective last-computed segmentation, followed by further refining the segmentation of each image using their respective last-computed optical flow estimates, until a prescribed number of iterations have been completed.

14 Claims, 14 Drawing Sheets

U.S. PATENT DOCUMENTS

| | | | | |
|---|---|---|---|---|
| 7,039,110 | B2* | 5/2006 | Ernst et al. | 348/699 |
| 2002/0090133 | A1* | 7/2002 | Kim et al. | 382/164 |
| 2004/0091170 | A1* | 5/2004 | Cornog et al. | 348/699 |
| 2004/0125877 | A1* | 7/2004 | Chang et al. | 375/240.28 |
| 2005/0226462 | A1* | 10/2005 | Wittebrood et al. | 382/103 |
| 2006/0023786 | A1* | 2/2006 | Li et al. | 348/36 |
| 2006/0177145 | A1* | 8/2006 | Lee et al. | 382/107 |
| 2007/0185946 | A1* | 8/2007 | Basri et al. | 708/200 |

OTHER PUBLICATIONS

Ayer, S., and H. Sawhney, Layered representation of motion video using robust maximum-likelihood estimation of mixture models and MDL encoding, *Proc. of the 5th Int'l Conf. on Computer Vision*, 1995, pp. 777-784.

Black, M., and P. Anandan, The robust estimation of multiple motions: Parametric and piecewise-smooth flow fields, *Comp. Vision and Image Understanding*, 1996, vol. 63, No. 1, pp. 75-104.

Black, M, and Y. Yacoob, A. Jepson and D. Fleet, Parameterized models of image motion, *CVPR*, 1997, pp. 561-567.

Chang, M., A. Tekalp, and M. Sezan, Simultaneous motion estimation and segmentation, *IEEE Trans. on Image Processing*, 1997, vol. 6, pp. 1326-1333.

Criminisi, A., P. Perez, and K. Toyama, Region filling an object removal by exemplar-based inpainting, *IEEE Trans. on Image Processing*, 2004, vol. 9, No. 13, pp. 1200-1212.

Heisele, B., U. Krebel, and W. Ritter, tracking non-rigid, moving objects based on color cluster flow, *CVPR*, 1997, pp. 253-257.

Horn, B., and B. Schunck, Determining optical flow, *Artificial Intelligence*, 1981, vol. 17, pp. 185-204.

Jepson, A., and M. Black, Mixture models for optical flow computation, *CVPR*, 1993, pp. 760, 761.

Kanna, A. N. Jojic, and B. Frey, Generative model for layers of appearance and deformation, *AIStats*, '05, 2005.

Khan, S., and M. Shah, Object based segmentation of video using color, motion and spatial information, *CVPR*, 2001, pp. 746-751.

Kschischang, F., B. Frey, and H. Loeliger, Factor graphs and the sum-product algorithm, *IEEE Trans. on Information Theory*, 2001, vol. 47, No. 2, pp. 498-519.

Lucas, B., and T. Kanade, An iterative image registration technique with an application to stereo vision, *Proc. of Image Understanding Workshop*, 1981, pp. 121-130.

Mukherjee, D., Y. Deng, and S. Mitra, Region based video coder using edge flow segmentation and hierarchical affine region matching, *Proc. SPIE, Visual Communications and Image Processing*, 1998, vol. 3309, pp. 338-349.

Neal, R., and G. Hinton, A veiw of the EM algorithm that justifies incremental, sparse and other variants, *Learning in Graphical Models*, ed. Jordan, M.I., 1998, pp. 355-368.

Szeliski, R., and J. Coughlin, Spline-based image registration, *IJCV*, 1997, vol. 22, No. 3, pp. 199-218.

Tao, H., H. Sawhney, and R. Kumar, A global matching framework for stereo computation, *ICCV*, 2001, pp. 532-539.

Wang, J., and E. Adelson, Representing moving images with layers, *Proc. of IEEE Trans. on Image Processing*, 1994, vol. 3, No. 5, pp. 625-638.

Wang, J., Y. Xu, H. Shum, M. Cohen, Video toning, *ACM SIGGRAPH and ACM trans. on Graphics*, 2004, pp. 574-583.

Weiss, Y. and E. Adelson, A unified mixture framework for motion segmentation: Incorporating spatial coherence and estimating the number of models, *CVPR*, 1996, pp. 321-326.

Weiss, Y., Smoothness in layers: Motion segmentation using nonparametric mixture estimation, *CVPR*, 1997, pp. 520-527.

Zitnick, C., S. B. Kang, M. Uyttendaele, S. Winder, and R. Szeliski, High-quality video view interpolation using layered representation, *ACM SIGGRAPH*, 2004, pp. 600-608.

\* cited by examiner

SIMULTANEOUS OPTICAL FLOW ESTIMATION AND IMAGE SEGMENTATION

CROSS-REFERENCE TO RELATED APPLICATIONS

This application claims the benefit of a previously-filed provisional patent application Ser. No. 60/669,675 on Apr. 8, 2005.

BACKGROUND

Background Art

Motion estimation is inherently ill-posed, and techniques ranging from regularization, use of global or parametric motion models, and segmentation have been used to reduce the problem. The approach of pre-segmenting images based on color similarity and estimating the motion of segments has been shown to be effective. Such approaches depend on the reasonable assumption that similarly colored neighboring pixels have similar motions (or depths). However, these approaches use statically-determined segments for motion estimation.

The problem with using static color segments is the inability to recover from errors in the segmentation process. Ideally, the shape of segments should evolve based on spatial-temporal evidence. Another challenge is the effect of discretization and area integration—pixels near texture or object boundaries are mixtures of foreground and background colors. Again, ideally, motion estimation should account for this effect.

Early work in optical flow centered around efficient methods using image gradients and hierarchical approaches. These methods were expanded upon using robust statistics to handle discontinuities in the flow field. Another approach uses 2D splines to approximate pair-wise image flow. Layered or segmentation approaches have also been proposed to allow for discontinuities while being able to enforce constraints on the flow within the segments. A first such attempt used the affine model for flow. This involved an iterative approach to create and remove segments, based on the pixel-wise flow. For segmentation, several methods use an expectation maximization approach. These methods include using mixture models, minimum description length encoding for segment creation and spatial coherence. Different constraints for flow vectors within segments have been used, including smoothness constraints and parameterized motion models. Unfortunately, results obtained using flow-based segmentation tend to be unpredictable at object boundaries due to the local aperture ambiguity. One approach for joint segmentation and flow computation involved a patch-based technique, but this method is computationally expensive.

Instead of segmenting based on just flow, techniques have also proposed using color information or a combination of flow and color for segmentation. Color-based segmentation has also been successfully used in the context of stereo and view interpolation.

SUMMARY

The present invention is directed toward an improved technique for estimating the optical flow between images of a scene and a segmentation of the images. This involves first establishing an initial segmentation of the images of the scene and an initial optical flow estimate for each segment of the images. In one embodiment of the present technique, the image segmentation is initialized using the a quad-tree approach that recursively breaks the image into smaller segments based on the variance of the color within the segment, and the flow vectors are initialized to 0 with the corresponding mappings. These flow vectors are estimates of the translation in an image plane that describes any movement of a segment from a position in the image under consideration to a position of the segment as seen in the next image in the sequence.

In one embodiment of the present technique, using a pair of images of a scene as an example, a refined optical flow estimate is computed for each segment of a first one of the images from the initial segmentation of that image and the initial optical flow of the segments of that image. This is followed by computing a refined optical flow estimate for each segment of the second image from the initial segmentation of that image and the initial optical flow of the segments of that image. Next, the segmentation of the first image is refined from the last-computed optical flow estimates for each segment of the first image, and the segmentation of the second image is refined from the last-computed optical flow estimates for each segment of the second image. Thus, the optical flow estimates are refined for both images and then the segmentation is refined for both images. The optical flow estimates represent a bi-directional optical flow between the images. This process can continue in an iterative manner by further refining the optical flow estimates for both images using their respective last-computed segmentation, followed by further refining the segmentation of each image using their respective last-computed optical flow estimates, until a prescribed number of iterations have been completed.

In embodiments of the present invention involving the segmentation and estimation of the optical flow for a sequence of images of a scene (i.e., 3 or more) the process is essentially the same, except each process action is performed on all the images. Thus, for each image in the sequence optical flow estimates will be computed or refined for all the images before computing or refining the segmentation of each image. In addition, for images in the sequence with neighbors both preceding it and succeeding it, the bi-directional optical flow estimates are computed between each neighbor and the image being processed.

It is noted that while the above-described technique initially refined the optical flow estimate for each segment of the image under consideration, before refining the segmentation, the order can be reversed. Thus, the segmentation would be refined first using the last-computed flow estimates (which could be the initial estimates if this is the first refinement cycle) and then the flow estimates would be refined based on the newly refined segmentation.

It is further noted that during the segmentation refining process, all of the pixels of the image under consideration are assigned to a main segment, and except in the initial segmentation, those pixels that contribute color to a lesser extent to a second segment (such as segment boundary pixels) are also assigned to a secondary segment. This also includes computing and assigning an alpha value to each pixel.

In addition to the just described benefits, other advantages of the present invention will become apparent from the detailed description which follows hereinafter when taken in conjunction with the drawing figures which accompany it.

DESCRIPTION OF THE DRAWINGS

The specific features, aspects, and advantages of the present invention will become better understood with regard to the following description, appended claims, and accompanying drawings where:

DETAILED DESCRIPTION OF THE PREFERRED EMBODIMENTS

In the following description of the preferred embodiments of the present invention, reference is made to the accompanying drawings which form a part hereof, and in which is shown by way of illustration specific embodiments in which the invention may be practiced. It is understood that other embodiments may be utilized and structural changes may be made without departing from the scope of the present invention.

1.0 The Computing Environment

Figure 1:
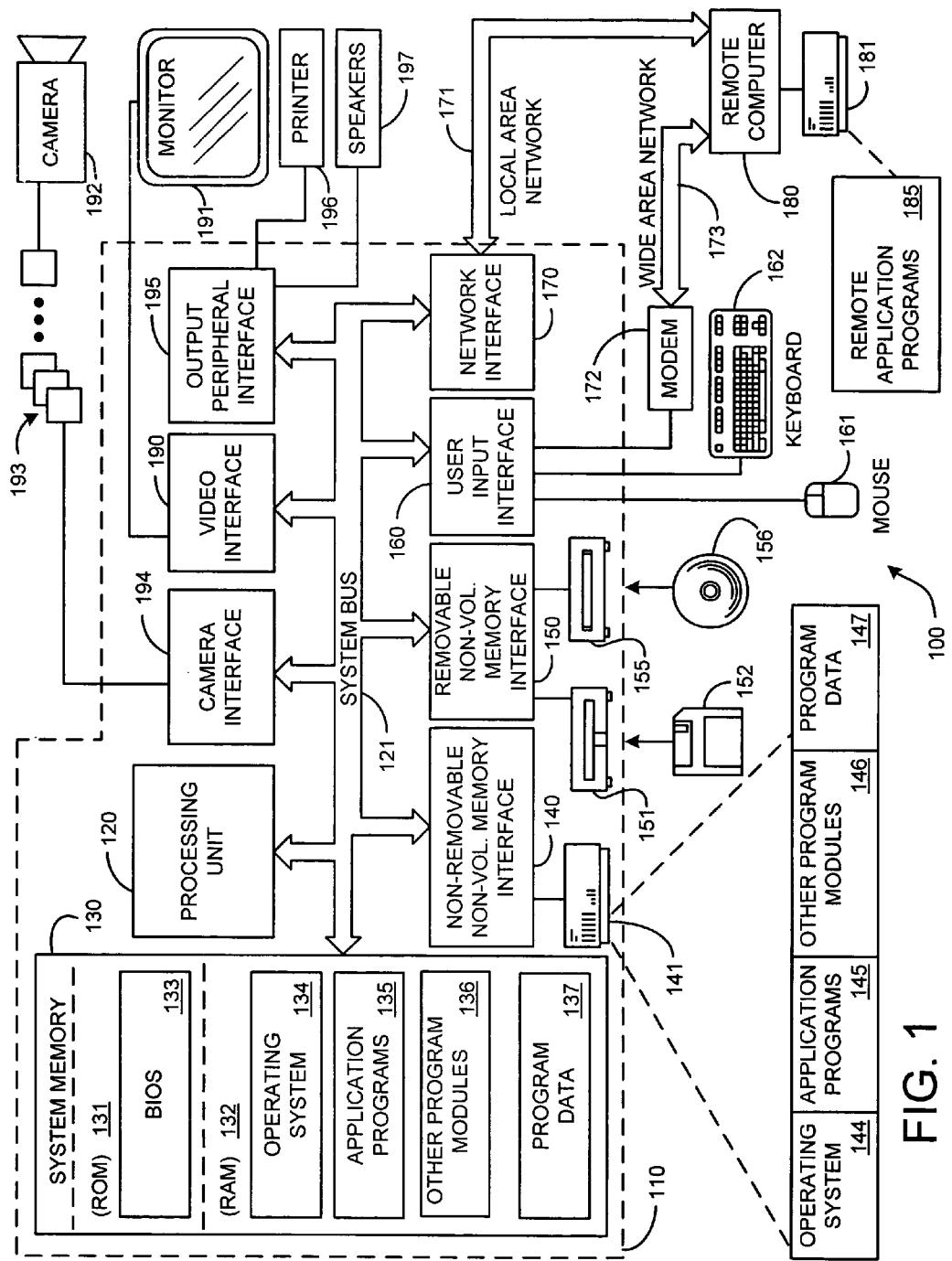
FIG. 1 is a diagram depicting a general purpose computing device constituting an exemplary system for implementing the present invention.

Before providing a description of the preferred embodiments of the present invention, a brief, general description of a suitable computing environment in which portions of the invention may be implemented will be described. FIG. 1 illustrates an example of a suitable computing system environment 100. The computing system environment 100 is only one example of a suitable computing environment and is not intended to suggest any limitation as to the scope of use or functionality of the invention. Neither should the computing environment 100 be interpreted as having any dependency or requirement relating to any one or combination of components illustrated in the exemplary operating environment 100.

The invention is operational with numerous other general purpose or special purpose computing system environments or configurations. Examples of well known computing systems, environments, and/or configurations that may be suitable for use with the invention include, but are not limited to, personal computers, server computers, hand-held or laptop devices, multiprocessor systems, microprocessor-based systems, set top boxes, programmable consumer electronics, network PCs, minicomputers, mainframe computers, distributed computing environments that include any of the above systems or devices, and the like.

The invention may be described in the general context of computer-executable instructions, such as program modules, being executed by a computer. Generally, program modules include routines, programs, objects, components, data structures, etc. that perform particular tasks or implement particular abstract data types. The invention may also be practiced in distributed computing environments where tasks are performed by remote processing devices that are linked through a communications network. In a distributed computing environment, program modules may be located in both local and remote computer storage media including memory storage devices.

With reference to FIG. 1, an exemplary system for implementing the invention includes a general purpose computing device in the form of a computer 110. Components of computer 110 may include, but are not limited to, a processing unit 120, a system memory 130, and a system bus 121 that couples various system components including the system memory to the processing unit 120. The system bus 121 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus.

Computer 110 typically includes a variety of computer readable media. Computer readable media can be any available media that can be accessed by computer 110 and includes both volatile and nonvolatile media, removable and non-removable media. By way of example, and not limitation, computer readable media may comprise computer storage media and communication media. Computer storage media includes both volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by computer 110. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer readable media.

The system memory 130 includes computer storage media in the form of volatile and/or nonvolatile memory such as read only memory (ROM) 131 and random access memory (RAM) 132. A basic input/output system 133 (BIOS), containing the basic routines that help to transfer information between elements within computer 110, such as during startup, is typically stored in ROM 131. RAM 132 typically contains data and/or program modules that are immediately accessible to and/or presently being operated on by processing unit 120. By way of example, and not limitation, FIG. 1 illustrates operating system 134, application programs 135, other program modules 136, and program data 137.

The computer 110 may also include other removable/non-removable, volatile/nonvolatile computer storage media. By way of example only, FIG. 1 illustrates a hard disk drive 141 that reads from or writes to non-removable, nonvolatile magnetic media, a magnetic disk drive 151 that reads from or writes to a removable, nonvolatile magnetic disk 152, and an optical disk drive 155 that reads from or writes to a removable, nonvolatile optical disk 156 such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 141 is typically connected to the system bus 121 through a non-removable memory interface such as interface 140, and magnetic disk drive 151 and optical disk drive 155 are typically connected to the system bus 121 by a removable memory interface, such as interface 150.

The drives and their associated computer storage media discussed above and illustrated in FIG. 1, provide storage of computer readable instructions, data structures, program modules and other data for the computer 110. In FIG. 1, for example, hard disk drive 141 is illustrated as storing operating system 144, application programs 145, other program modules 146, and program data 147. Note that these components can either be the same as or different from operating system 134, application programs 135, other program modules 136, and program data 137. Operating system 144, application programs 145, other program modules 146, and program data 147 are given different numbers here to illustrate that, at a minimum, they are different copies. A user may enter commands and information into the computer 110 through input devices such as a keyboard 162 and pointing device 161, commonly referred to as a mouse, trackball or touch pad. Other input devices (not shown) may include a microphone, joystick, game pad, satellite dish, scanner, or the like. These and other input devices are often connected to the processing unit 120 through a user input interface 160 that is coupled to the system bus 121, but may be connected by other interface and bus structures, such as a parallel port, game port or a universal serial bus (USB). A monitor 191 or other type of display device is also connected to the system bus 121 via an interface, such as a video interface 190. In addition to the monitor, computers may also include other peripheral output devices such as speakers 197 and printer 196, which may be connected through an output peripheral interface 195. A camera 192 (such as a digital/electronic still or video camera, or film/photographic scanner) capable of capturing a sequence of images 193 can also be included as an input device to the personal computer 110. Further, while just one camera is depicted, multiple cameras could be included as input devices to the personal computer 110. The images 193 from the one or more cameras are input into the computer 110 via an appropriate camera interface 194. This interface 194 is connected to the system bus 121, thereby allowing the images to be routed to and stored in the RAM 132, or one of the other data storage devices associated with the computer 110. However, it is noted that image data can be input into the computer 110 from any of the aforementioned computer-readable media as well, without requiring the use of the camera 192.

The computer 110 may operate in a networked environment using logical connections to one or more remote computers, such as a remote computer 180. The remote computer 180 may be a personal computer, a server, a router, a network PC, a peer device or other common network node, and typically includes many or all of the elements described above relative to the computer 110, although only a memory storage device 181 has been illustrated in FIG. 1. The logical connections depicted in FIG. 1 include a local area network (LAN) 171 and a wide area network (WAN) 173, but may also include other networks. Such networking environments are commonplace in offices, enterprise-wide computer networks, intranets and the Internet.

When used in a LAN networking environment, the computer 110 is connected to the LAN 171 through a network interface or adapter 170. When used in a WAN networking environment, the computer 110 typically includes a modem 172 or other means for establishing communications over the WAN 173, such as the Internet. The modem 172, which may be internal or external, may be connected to the system bus 121 via the user input interface 160, or other appropriate mechanism. In a networked environment, program modules depicted relative to the computer 110, or portions thereof, may be stored in the remote memory storage device. By way of example, and not limitation, FIG. 1 illustrates remote application programs 185 as residing on memory device 181. It will be appreciated that the network connections shown are exemplary and other means of establishing a communications link between the computers may be used.

The exemplary operating environment having now been discussed, the remaining parts of this description section will be devoted to a description of the program modules embodying the invention.

2.0 The Simultaneous Optical Flow Estimation and Image Segmentation Technique

The simultaneous optical flow estimation and image segmentation technique according to the present invention is motivated by, among others, the application of high-quality video editing. This requires not only good optical flow estimation, but accurate segmentation and background/foreground separation. All these must exist concurrently for the video editing results to be acceptable.

In general, the present technique involves matching segments instead of pixels, which is significantly more efficient without sacrificing visual quality. In addition, it reduces the ill-posed nature of flow estimation. The technique also avoids committing to an initial fixed segmentation for flow estimation. Instead, the segments are adaptively reshaped based on both spatial and temporal evidence. Matting is also deliberately factored in to account for mixed pixels. The extracted alpha value distributions help to significantly reduce typical artifacts (such as haloing at object boundaries) in applications requiring the interpolation of frames. In addition, it permits extraction of very thin objects, which would have been very difficult to recover otherwise.

Once the segmentation and optical flow estimates for the corresponding segments between a pair of images of the scene have been computed and refined to the desired degree, they can be employed for a variety of purposes. For example, many applications such as video de-noising, re-timing video, and object tracking employ per pixel optical flow estimates. These per pixel estimate can be obtained according to the present invention by simply assigning the optical flow computed for a segment to each its pixels. Other applications such as object extraction and editing use per segment flow estimates. The present invention is particularly advantageous in these applications because in the past segment-based optical flow estimation procedures involved computing the flow of each pixel between frames and then averaging the flow of the pixels in each segment to establish a flow for that segment. However, the present invention involves finding corresponding segments between images and then determines the translation associated with the segment from one image to the next. This translation is designated as the segment's flow. Thus, no pixel-by-pixel flow calculations are needed, thereby simplifying the process considerably.

In its most general terms, the technique according to the present invention estimates the segmentation of, and optical flow between, a pair of images of a scene. This basic technique can then be expanded to a longer sequence of images, such as frames in video. The basic two-image segmentation and optical flow estimation technique will be described first followed by its expansion for longer image sequences.

2.0 Optical Flow Estimation and Image Segmentation for an Image Pair

Figure 2:
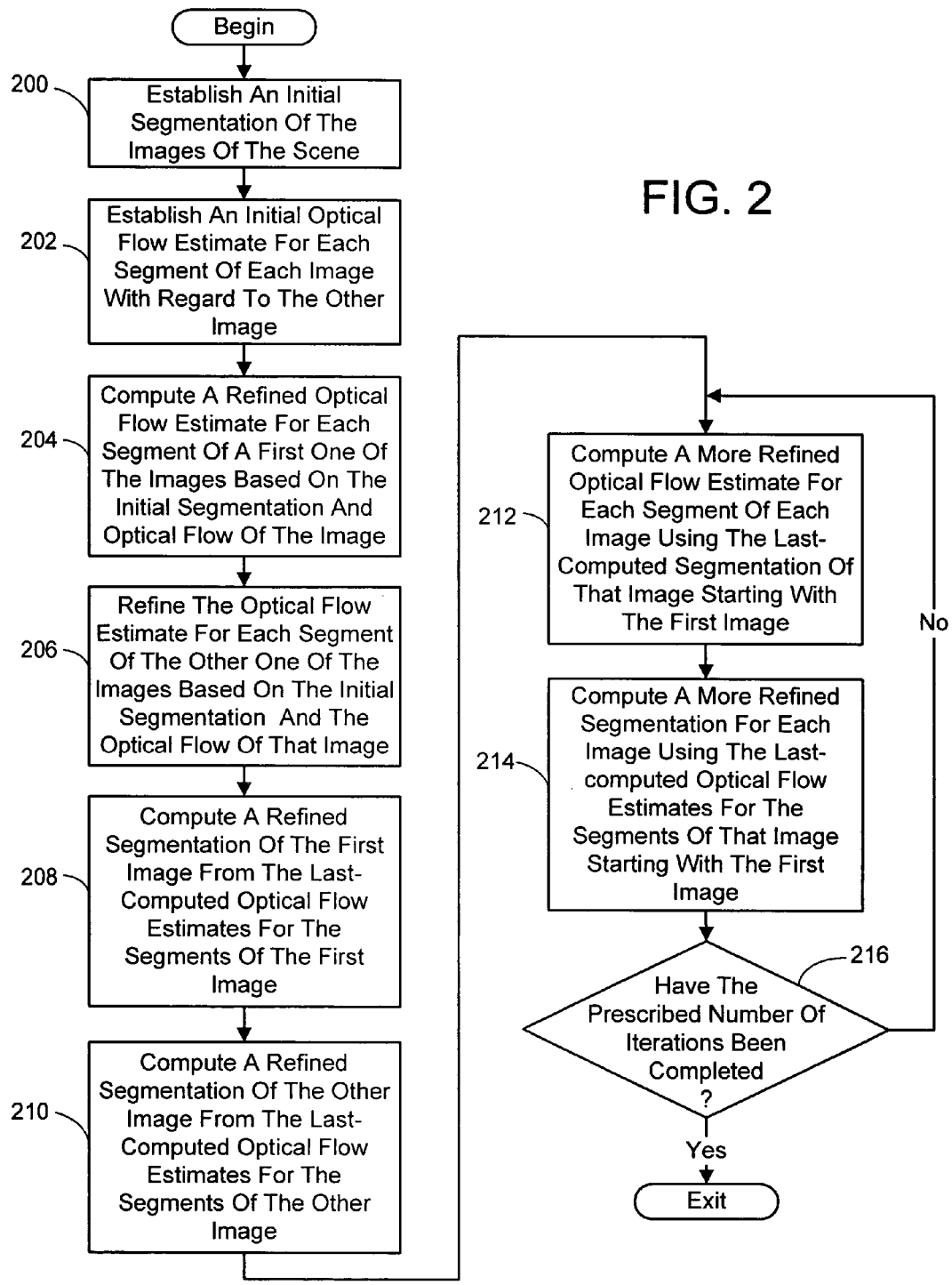
FIG. 2 is a flow chart diagramming a process for segmenting and estimating optical flow between a pair of images of a scene according to the present invention.

As outlined in FIG. 2, in its most general terms the technique according to the present invention for segmenting and estimating the optical flow between a pair of images of a scene involves first establishing an initial segmentation of the images (process action 200) and establishing an initial optical flow estimate for each segment of each image with regard to the other image (process action 202). In this case, the optical flow estimate is the estimate of a translation that describes any movement of the segment from a position in one image to a position of the segment as seen in the other image in the sequence. This is significant because in the past segment-based optical flow estimation procedures employed large segments and complex six-degree-of-freedom affine flow descriptions to define the movement of the segments from frame to frame. However, the system and process according to the present invention employs relatively small segments that allow the optical flow to be estimated as a one-degree translation—e.g., as a direction and distance in the image plane representing the difference in position between the centroids of two corresponding segments between the images.

Referring again to FIG. 2, the process continues with the computation of a refined optical flow estimate for each segment of a first one of the images based on the initial segmentation of the image and the initial optical flow of the segments of the image (process action 204), and then refining the optical flow estimate for each segment of the other image based on the initial segmentation of the image and the initial optical flow of the segments of the image (process action 206). If desired, a refined segmentation of the images can be computed at this point. More particularly, a refined segmentation of the first image is computed from the last-computed optical flow estimates for the segments of the first image (process action 208), and then a refined segmentation of the other image is computed from the last-computed optical flow estimates for the segments of the other image (process action 210). The optical flow estimates and image segmentation can be further refined in an iterative manner starting with the first image and then the other image by computing a more refined optical flow estimate for each segment of each image using the last-computed segmentation of that image (process action 212), and then computing a more refined image segmentation using the last-computed optical flow estimates for the segments of that image (process action 214). This iterative refinement procedure can continue until a prescribed number of iterations have been completed (e.g., 30-50 iterations). More particularly, it is determined if the prescribed number of iterations has been completed (process action 216). If not, then process actions 212 through 216 are repeated. When the prescribed number of iterations has been reached, the process ends.

It is also noted that while the above-described process initially refined the optical flow estimate for each segment of each image, before refining the segmentation of each image, the order can be reversed. Thus, the segmentation would be refined first using the last-computed flow estimates (which could be the initial estimates if this is the first refinement cycle) and then the flow estimates would be refined based on the newly refined segmentation.

2.1 Initial Segmentation and Optical Flow Field

The initial segmentation of an image is accomplished in one embodiment of the present invention using a quadtree approach. More particularly, the image is divided into a grid of equal-sized squares referred to as blocks. For example, in tested embodiments the image was divided into 60×60 pixel blocks. A block is selected and it is determined if the pixels of the block exhibit a color variation that exceeds a prescribed threshold. If the threshold is exceeded, the selected block is split into four equal blocks. One of these newly formed blocks is then selected and the above-described color variation test is performed. Again if the threshold is exceeded, the selected block is split into four equal blocks. This process is repeated until a resulting block has a color variation that does not exceed the threshold, or the block is at or below a prescribed minimum segment size, as measured by the number of pixels in the block (e.g., 10×10). This block is then designated as one of the initial segments of the image being segmented and the pixels of the block are assigned to that segment. At this point, another of the blocks in the same level as the newly designated segment is selected and the color variation test/splitting segment designation actions are repeated as described above. When all the blocks in a particular level down from the original block have been designated as segments, then the foregoing process is repeated for the unprocessed blocks in the next level up in the same manner. Eventually the original block will be completely segmented. At that point the entire process is repeated for another of the original blocks not yet processed. When the last original block is completely segmented, the process ends. At this point all the pixels of the image will be assigned to a segment.

As for the initial flow field, all the segments are assigned the same flow vector. In tested embodiments all the segments were assign zero vectors (i.e., no movement).

2.2. Segmentation Refinement

Given an optical flow field made up of flow vectors for each segment (initial or refined), a refined segmentation can be computed as follows. Essentially, the refinement process involves determining which main and secondary segments each pixel in the image under consideration belongs to and if the pixel is not already assigned to either its main or secondary segment, doing so. A main segment is the segment to which the pixel gives the most color contribution and the secondary segment is an adjacent segment to which the pixel contributes lesser color. It is noted that only pixels existing on the borders of segments are mixed in that they contribute to more than one segment. These pixels are defined as having an alpha value ($\alpha$) between 0 and 1 in association with the main segment and $1-\alpha$ in the secondary segment. For those pixels that are farther in the interior of a segment and which do not contribute any color to an adjacent segment, their $\alpha$ is equal to 1. In these cases the pixel is only assigned to a main segment and not to a secondary segment. The color contributions to the main and secondary segments are defined by the following equation:

$$C_{pixel} = \alpha C_{main} + (1-\alpha) C_{secondary} \quad (1)$$

where $C_{pixel}$ is the color of the pixel under consideration, $C_{main}$ is the average color of the segment to which the pixel contributes the greatest amount and $C_{secondary}$ is the average color of the segment to which the pixel contributes a lesser amount.

Figure 3A:
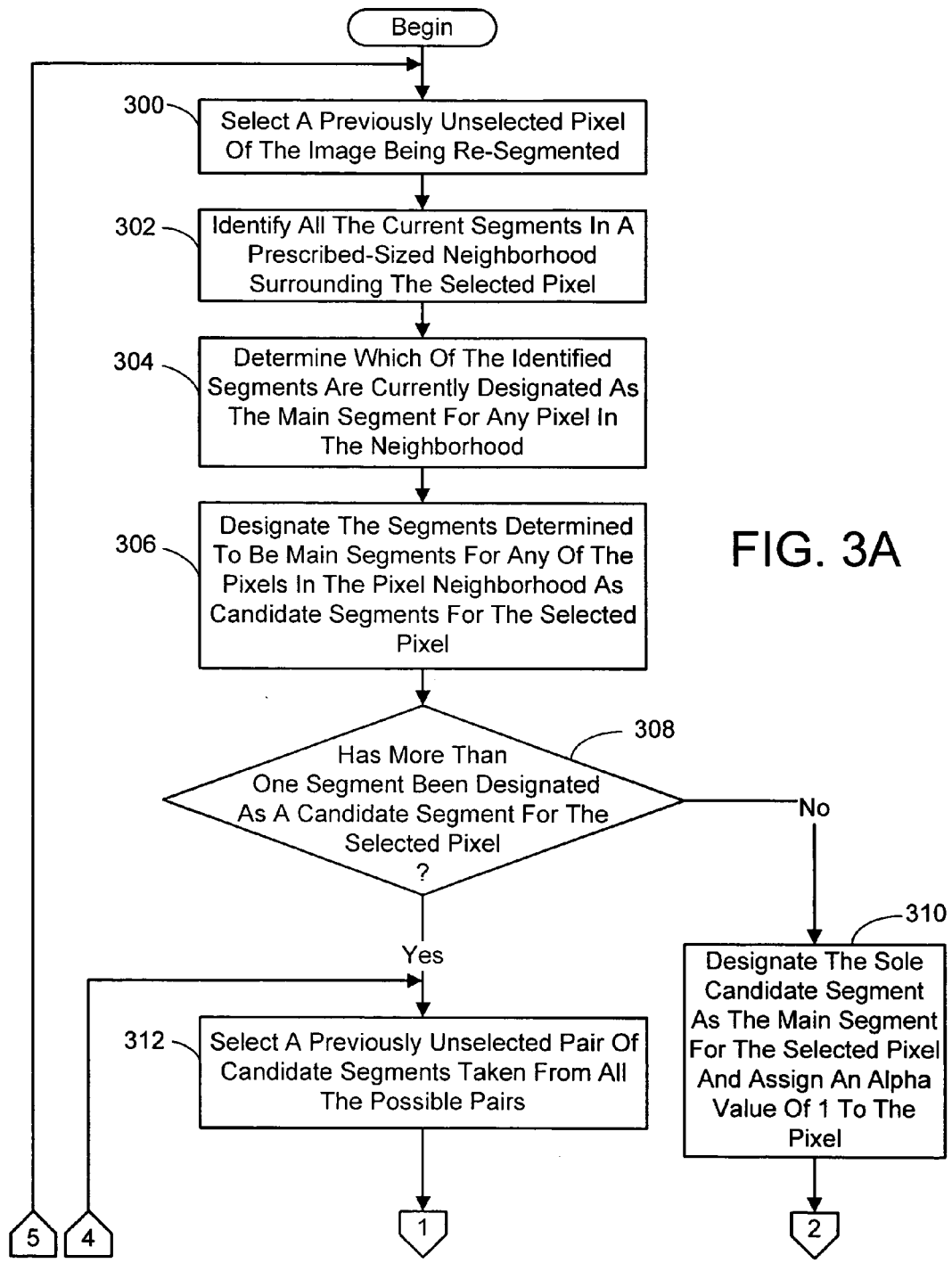
FIGS. 3A-C are a continuing flow chart diagramming a process for segmenting images according to one embodiment of the present invention.
Figure 3B:
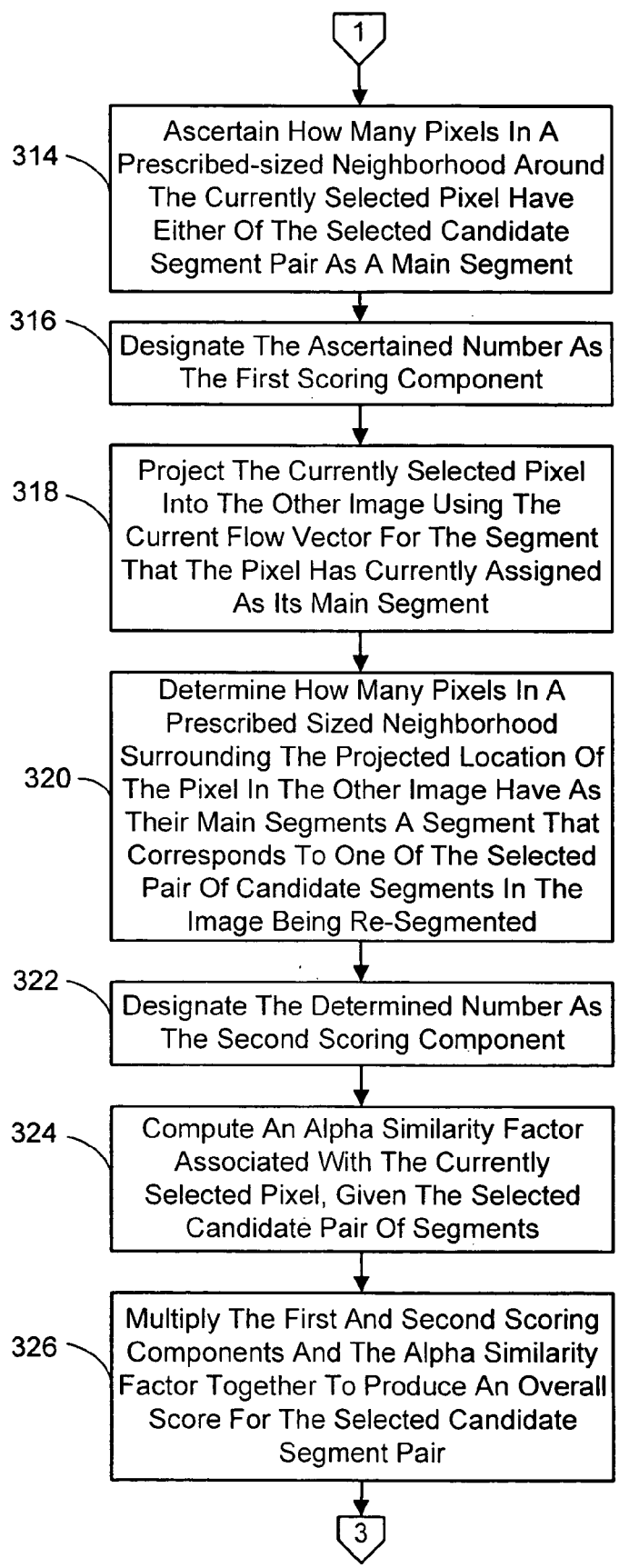
Figure 3C:
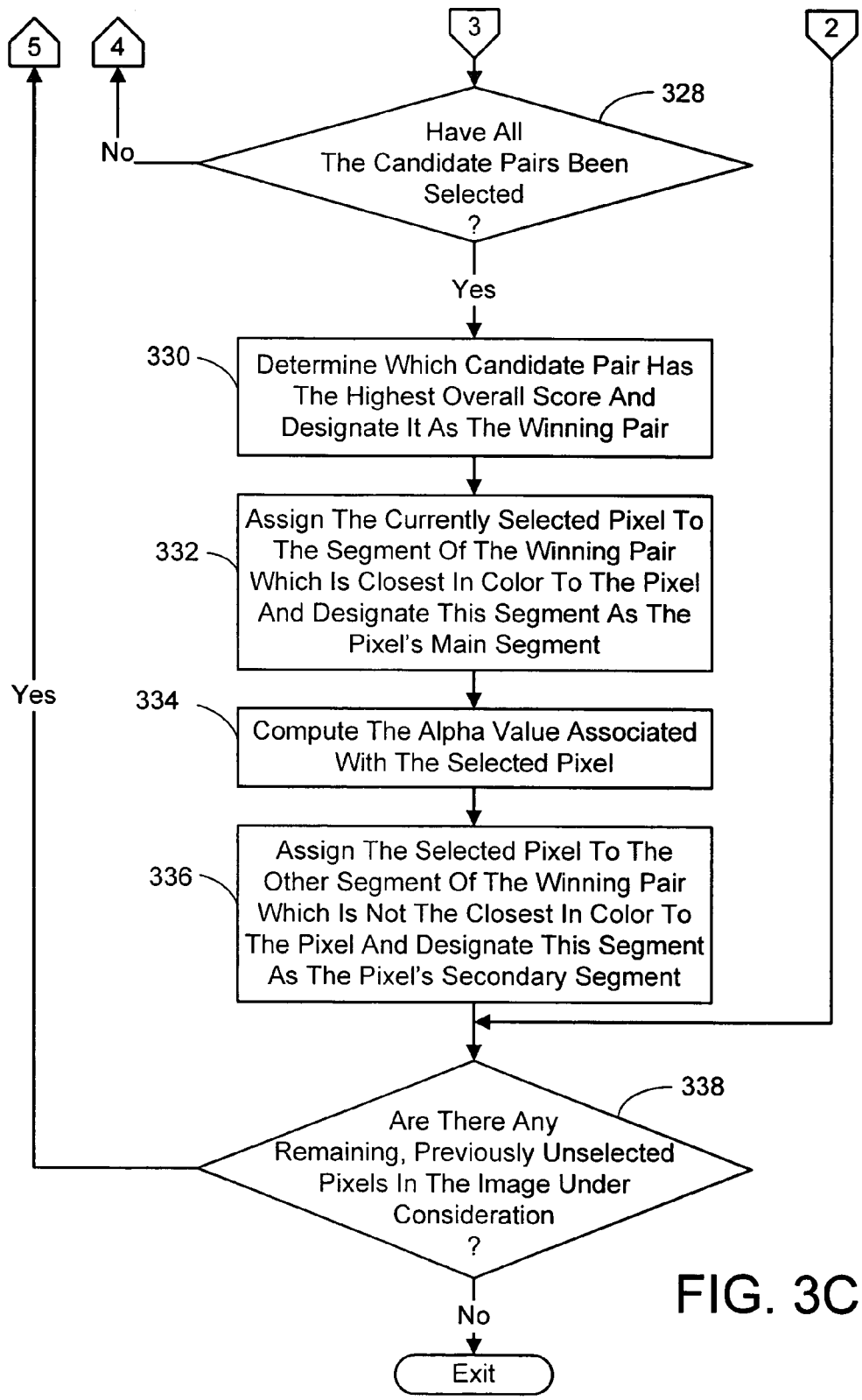

While every possible pair of segments in the image under consideration can be tested to determine which pair are the main and secondary segments for a pixel, processing cost can be reduced by employing the following procedure. Referring to FIGS. 3A-C, first a previously unselected pixel of the image being re-segmented is selected (process action 300). All the segments in a prescribed-sized pixel neighborhood surrounding the selected pixel are then identified using the last-computed segmentation of the frame—which could be the initial segmentation (process action 302). While any size pixel neighborhood can be employed, a 5×5 neighborhood was used in tested embodiments. Next, it is determined which of the identified segments are currently designated as the main segment for any pixel in the neighborhood (process action 304). If the last-computed segmentation is the initial segmentation, then the segment to which a pixel was assigned in the segmentation process is considered the main segment for that pixel. The segments determined to be main segments for any of the pixels in the pixel neighborhood are designated as candidate segments for the selected pixel (process action 306). It is noted that for interior pixels of a segment, the foregoing actions will result in only one segment being identified as a candidate segment if the prescribed-sized pixel neighborhood is made small as in the tested embodiments. Given this, it is next determined if more than one segment has been designated as a candidate segment for the selected pixel (process action 308). If not, the sole candidate segment is designated as the main segment for the pixel and an alpha value of 1 is assigned to the selected pixel (process action 310).

In general the next part of the process entails finding the pair of candidate segments that are closest both in color to the pixel under consideration and physical distance to the pixel, whenever more than one candidate segment is designated for that pixel. This is accomplished in one embodiment of the present invention as follows. Referring again to FIGS. 3A-C, whenever it is determined that the selected pixel has more than one designated candidate segment, a previously unselected pair of candidate segments taken from all the possible pairs is selected (process action 312). It is next ascertained how many pixels in a prescribed-sized neighborhood around the currently selected pixel have either of the selected candidate segment pair as a main segment (process action 314). This is designated as the first scoring component (process action 316). While any size pixel neighborhood can be employed, a 5×5 neighborhood was used in tested embodiments. In addition, the currently selected pixel is projected into the other image using the given flow vector for the segment that the pixel has currently assigned as its main segment (process action 318). This flow vector approximates the distance and direction the pixel moves in the other image. It is then determined how many pixels in a prescribed sized neighborhood surrounding the projected location of the pixel in the other image have as their main segments a segment that corresponds to one of the selected pair of candidate segments in the image being re-segmented (process action 320). This is designated as the second scoring component (process action 322). While any size pixel neighborhood can be employed, a 3×3 neighborhood was used in tested embodiments.

Next an alpha similarity factor associated with the currently selected pixel, given the selected candidate pair of segments, is computed (process action 324). The alpha similarity factor represents how close the pixel color is to alpha blended color of the candidate pair of segments. This can be accomplished using the following equation:

$$e^{-R(p,S_{i,k},S_{i,l})^2/\sigma_s^2} \quad (2)$$

where R is the residual associated with pixel p, main segment $S_{i,k}$ and secondary segment $S_{i,l}$; and $\sigma_s$ is an estimated standard deviation of the variation in color among pixels within the main segment. The residual R is computed using conventional means.

In geometric terms, the alpha value is the distance between a point on a line in color space (e.g., RGB color space) passing through the coordinates of the average color associated with a candidate pair of segments, to the more distant color coordinate associated with one of the pair of segments, divided by the overall distance between the color coordinates of the two segments, whenever the aforementioned point is between the color coordinates of the segment pair. The point is defined as the place where a line (representing the residual R) extends perpendicularly to the color coordinates of the pixel under consideration. The segment corresponding to the color closest to the color of the pixel under consideration is the main segment of the pixel, while the other segment of the segment pair is the secondary segment. However, if the aforementioned point does not fall in between the color coordinates of the candidate segment pair, then the segment of the pair corresponding to the closest color is the main segment of the pixel under consideration, but the pixel is not assigned to a secondary segment. This latter case corresponds to an interior pixel.

Referring again to FIGS. 3A-C, the first and second scoring components and the alpha similarity factor are multiplied together to produce an overall score for the selected candidate segment pair (process action 326). It is next determined if all the candidate pairs have been selected (process action 328). If not, process actions 312 through 328 are repeated. When all the candidate pairs have been processed, it is then determined which pair has the highest overall score and this pair is designated as the winning pair (process action 330). The currently selected pixel is assigned to the segment of the winning pair which is closest in color to the pixel and this segment is designated as the pixel's main segment (process action 332). In addition, the alpha value associated with the currently selected pixel is computed (process action 334). This can be accomplished using Eq. (1) as the average colors of the winning candidate segment pair are known, as is the color of the currently selected pixel. The selected pixel is also assigned to the other segment of the winning pair which is not the closest in color to the pixel and this segment is designated as the pixel's secondary segment (process action 336).

Mathematically, the foregoing part of the process involves maximizing the following equation for the selected pixel and all the pairs of candidate main and secondary segments:

$$e^{-R(p,S_{i,k},S_{i,l})^2/\sigma_s^2} N(p,S_{i,k}) N'(p,S_{j,k'}) \quad (3)$$

where $N(p,S_{i,k})$ is the aforementioned first scoring component and $N'(p,S_{j,k'})$ is the aforementioned second scoring component.

It is also noted that the overall score computed for each pair of candidate segments could optionally be divided by the number of pixels in the proposed main segment before determining the maximum score. This accounts for segment size and biases the computation slightly more toward smaller segments.

Once the selected pixel has been assigned to a main segment, and possibly to a secondary segment, it is determined if there are any remaining, previously unselected pixels in the image under consideration (process action 338). If so, process actions 300 through 338 are repeated. Otherwise the segmentation process ends.

2.3. Flow Estimate Refinement

Once all the pixels in an image being re-segmented have been assigned to a main segment (and possible a secondary segment as well) in the manner described above, the result is a refined segmentation of the image based on the current flow estimates. This refined segmentation can then be used to refine the flow estimates. Alternately, it is also possible to start with a refinement of the flow estimates before refining the segmentation. In such a case, the initial segmentation is used to refine the flow estimates.

Figure 4:
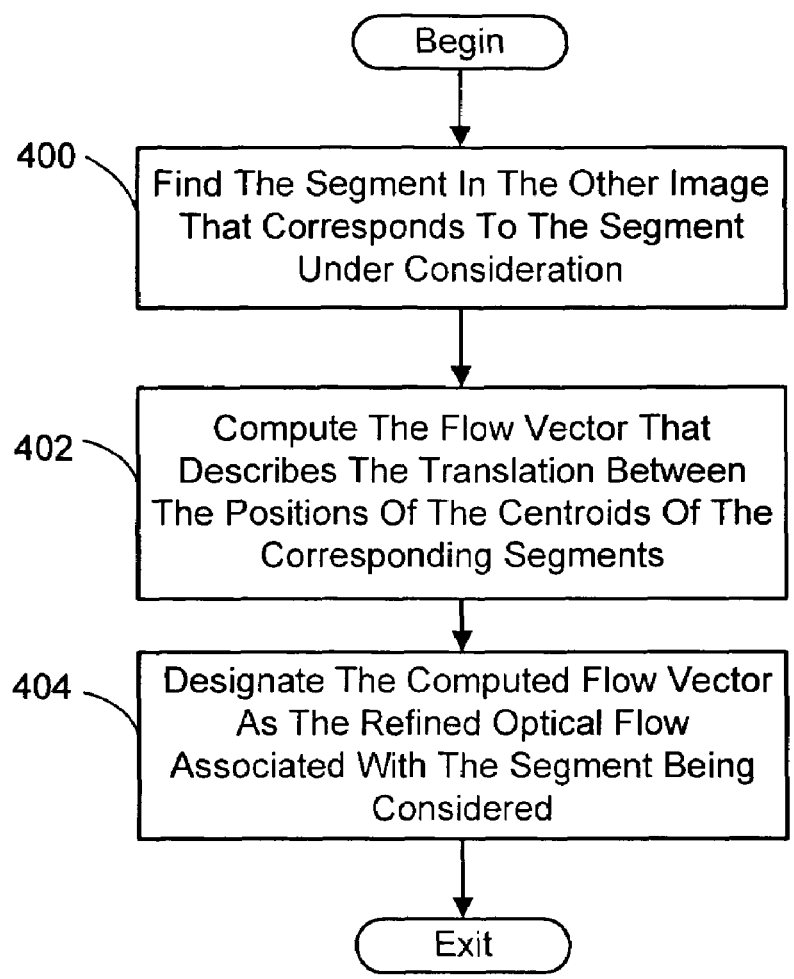
FIG. 4 is a flow chart diagramming a process for estimating the optical flow between images according to one embodiment of the present invention.

In either case, the optical flow estimate for each segment in the image under consideration is essentially refined as outlined in FIG. 4. First, the segment in the other image in the sequence that corresponds to the segment under consideration is found (process action 400). Then, the flow vector that describes the translation between the positions of the centroids of the corresponding segments is computed (process action 402). For most sets of corresponding segments, the computed flow vector is designated as the refined optical flow associated with the segment being considered (process action 404). The exceptions will be discussed shortly.

In regard to finding a set of corresponding segments between two images, this is accomplished as follows. Generally, for each segment in the image under consideration, the segment in the other frame that is closest in size and color, and which is no so far away from the position of the segment that it is inconsistent with the flow of surrounding segments, is deemed to be the corresponding segment. In one embodiment of the present invention this is accomplished by, for each segment in the image under consideration, maximizing the following equation by testing each segment in the other image in the sequence:

$$e^{-(\Delta C)^2/\sigma_c^2} T(S_{i,k}, S_{j,l}) e^{-((\Delta x) - \bar{v}(S_{i,k}))^2/\sigma_x^2} \quad (4)$$

where $\Delta C$ is represents the difference in the average color of the two segments, $\sigma_c$ is the estimated standard deviation of the difference in the average color of the two segments, $T(S_{i,k}, S_{j,l})$ is a segment size similarity term, $\Delta x$ is the difference between the positions of the centroids of the two segments, $\bar{v}(S_{i,k})$ is a weighted average flow of the segments of the image under consideration i as computed using the flow field established in the prior iteration (or using the initial flow field if this is the first iteration), and $\sigma_x$ is the estimated standard deviation of the difference in the position of the centroids of the two segments.

The first factor in Eq. (4), i.e., $e^{-(\Delta C)^2/\sigma_c^2}$, is directed at finding a segment in the other image that is close in color to the segment under consideration. The second factor in Eq. (4) is the segment size similarity factor and is designed to find the segment in the other frame that is close in size to the segment under consideration. This segment size similarity term $T(S_{i,k}, S_{j,l})$ is computed as follows:

$$T(S_{i,k}, S_{j,l}) = \frac{\min(\#S_{i,k}, \#S_{j,l})}{\max(\#S_{i,k}, \#S_{j,l})}$$

where $\#S_{i,k}$ is the number of pixels in the segment k under consideration and $\#S_{j,l}$ is the number of pixels in a segment l in the other image j. Thus, this term is simply the number of pixels of the segment having the fewer number of pixels divided by the number of pixels of the segment having the greater number of pixels.

The last factor in Eq. (4), i.e., $e^{-((\Delta x) - \bar{v}(S_{i,k}))^2/\sigma_x^2}$, is a regularization factor that ensures a segment in the other image that is close to the size and color of the segment under consideration is not so far away in position that it is inconsistent with the flow of other segments in the image under consideration. This is accomplished by considering how far the difference in position between the centroids of the segments being compared is from the weighted average flow. In regard to the weighted average flow, the flow vectors used to compute this factor are weighted using both the differences in color and distance between the segment under consideration and each of the other segments in the image. More particularly, the weighted average flow $\bar{v}(S_{i,k})$ is computed as follows:

$$\bar{v}(S_{i,k}) = \frac{\sum_l v(S_{i,l}) e^{-(\Delta C)^2/\sigma_{c_i}^2} e^{-(\Delta x)^2/\sigma_{x_i}^2}}{\sum_l e^{-(\Delta C)^2/\sigma_{c_i}^2} e^{-(\Delta x)^2/\sigma_{x_i}^2}} \quad (5)$$

(5)

where $v(S_{i,l})$ is a flow vector of a segment l of the image under consideration i as computed in the last iteration (or from the initial flow field if this is the first iteration), and where l refers to a segment of the frame. Further, in this case $\Delta C$ represents the difference in the average color between the segment k under consideration and a segment l in the image, $\sigma_{c_i}$ is the estimated standard deviation of the difference in the average color of the segment k and segment l in the image under consideration i, $\Delta x$ represents the difference in the positions of the centroids between the segment k under consideration and a segment l, and $\sigma_{x_i}$ is the estimated standard deviation of the difference in the position of the centroids of the segment k and segment l in the image under consideration i.

It is noted that a minimum similarity threshold can be imposed on the foregoing calculations. Thus, if the maximum similarity computed for a pair of segments between the images is found to be below the minimum similarity threshold, the pair of segments would not be deemed to be corresponding. In such a case the segment under consideration in the image under consideration would not be assigned a corresponding segment in the other image.

Figure 5A:
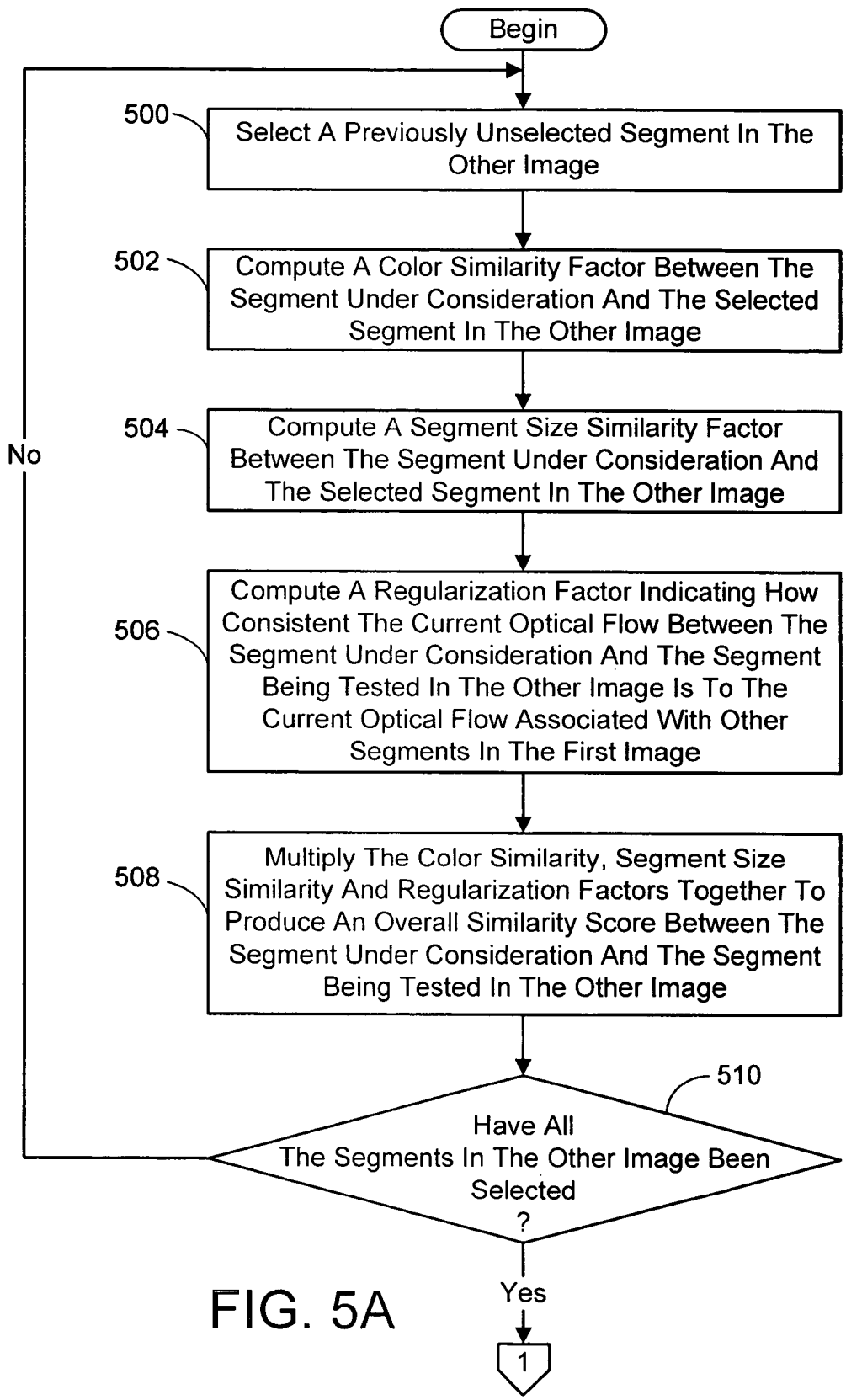
FIGS. 5 A-B are a continuing flow chart diagramming a process for finding corresponding segments between two neighboring images according to one embodiment of the present invention, which is employed as part of the optical flow estimation process.
Figure 5B:
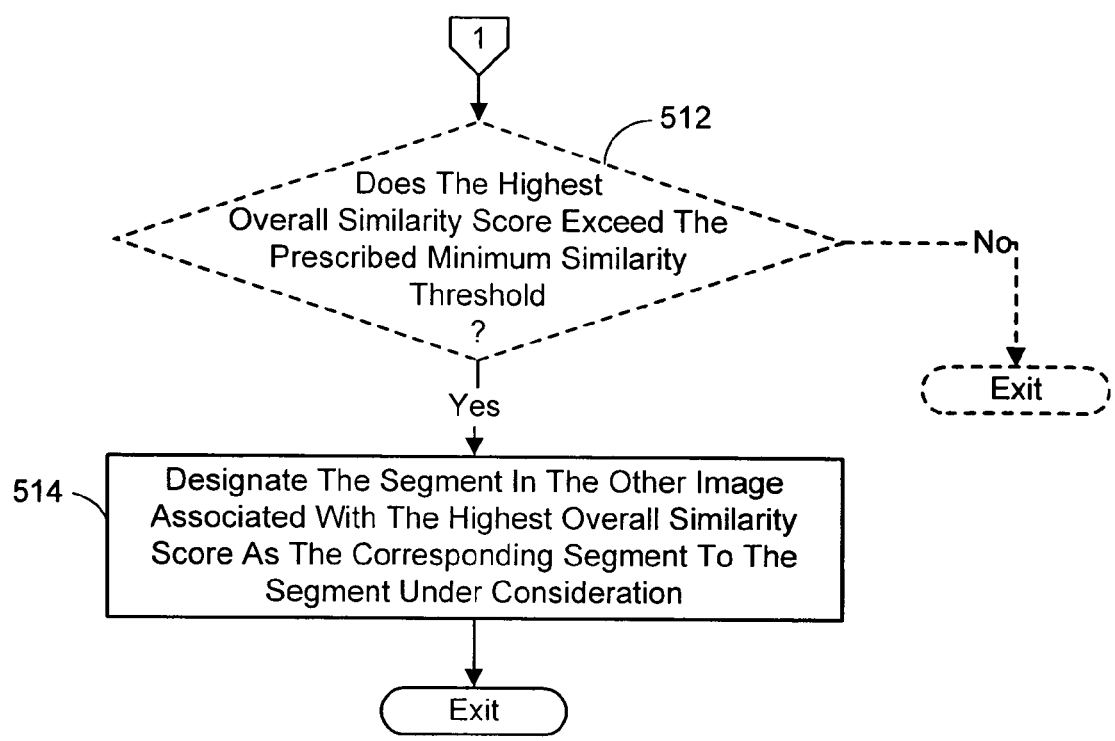

The foregoing process for finding a corresponding segment in the other image in the sequence for a segment in the image being considered is outlined in FIGS. 5A-B. The process begins by selecting a previously unselected segment in the other image (process action 500). The color similarity factor, which represents how close in color the segment under consideration is to the segment being tested in the other image in the sequence, is computed next (process action 502). Then, the aforementioned segment size similarity factor is computed (process action 504). As indicated previously, this factor represents how close in size the segment under consideration is to the segment being tested in the other image. In addition, the regularization factor is computed (process action 506). This factor represents how consistent the optical flow between the segment under consideration and the segment being tested in the other image is to optical flow associated with other segments in the image.

The color similarity, segment size similarity and regularization factors are multiplied together to produce an overall similarity score between the segment under consideration and the segment being tested in the other image (process action 508). It is then determined if all the segments in the other image have been selected and tested (process action 510). If not, process actions 500 through 510 are repeated. Once there has been an overall similarity score established between the segment under consideration and each of the segments in the other image, the segment in the other image associated with the highest overall score could be deemed the corresponding segment. However, an optional test can be performed first as shown in FIG. 5B in the broken-line elements. This test involves determining if the highest overall similarity score produced exceeds a prescribed minimum similarity threshold (process action 512). This provides confidence that the segment in the other image associated with the highest score actually corresponds to the segment under consideration. If it is determined that the highest overall score exceeds the minimum similarity threshold, then the segment in the other image associated with the highest overall similarity score is designating as the corresponding segment to the segment under consideration (process action 514), and the process ends. If the threshold is not exceeded, then the process ends with a corresponding segment not being assigned to the segment under consideration.

Once a corresponding segment has been found in the other image for every segment in the image under consideration that it is possible to do so for, the flow vectors are computed. As indicated previously, this is accomplished for most sets of corresponding segments by computing the flow vector that describes the translation between the positions of the centroids of the corresponding segments. However, in some cases this method will not provide accurate results owing to the fact that some of the pixels are occluded in the other image. In such a case the centroid of the segment with occluded pixels will not accurately match to a corresponding location within the other image of the pair. This skews the translation computation results.

Figure 6A:
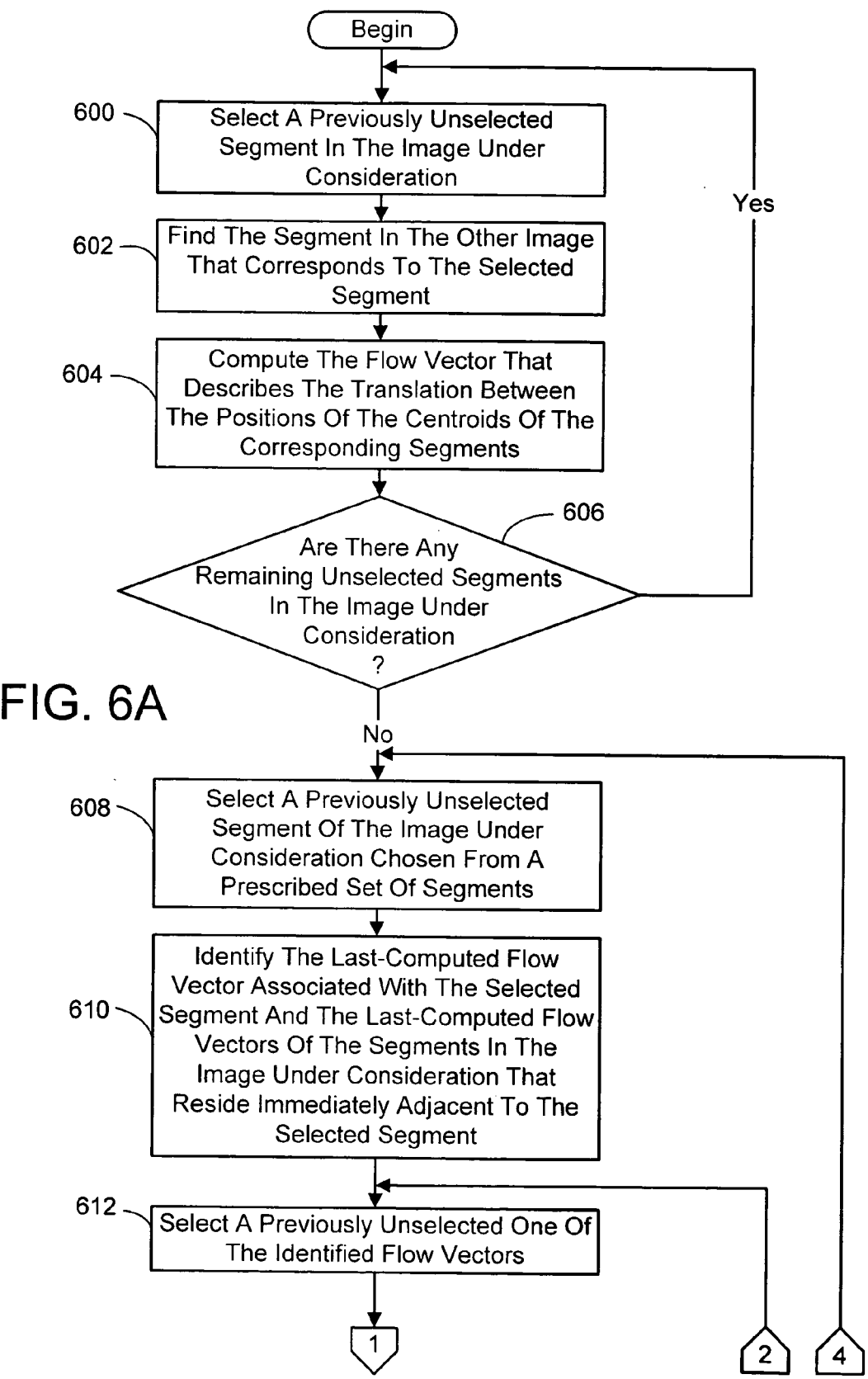
FIGS. 6A-C are a continuing flow chart diagramming a process for computing a flow vector for each segment of an image with regard to a neighboring image according to one embodiment of the present invention, which is employed as part of the optical flow estimation process.
Figure 6B:
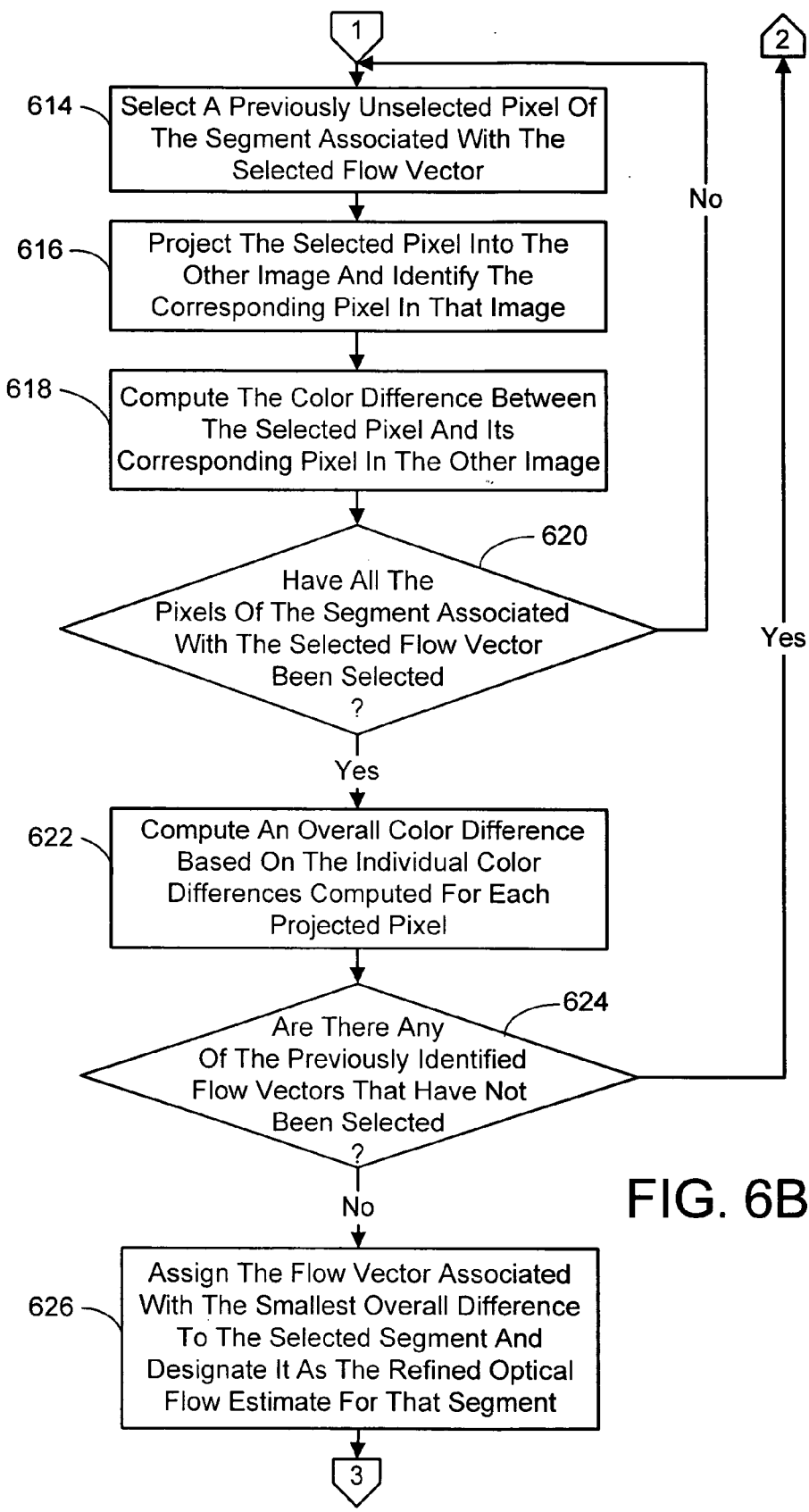
Figure 6C:
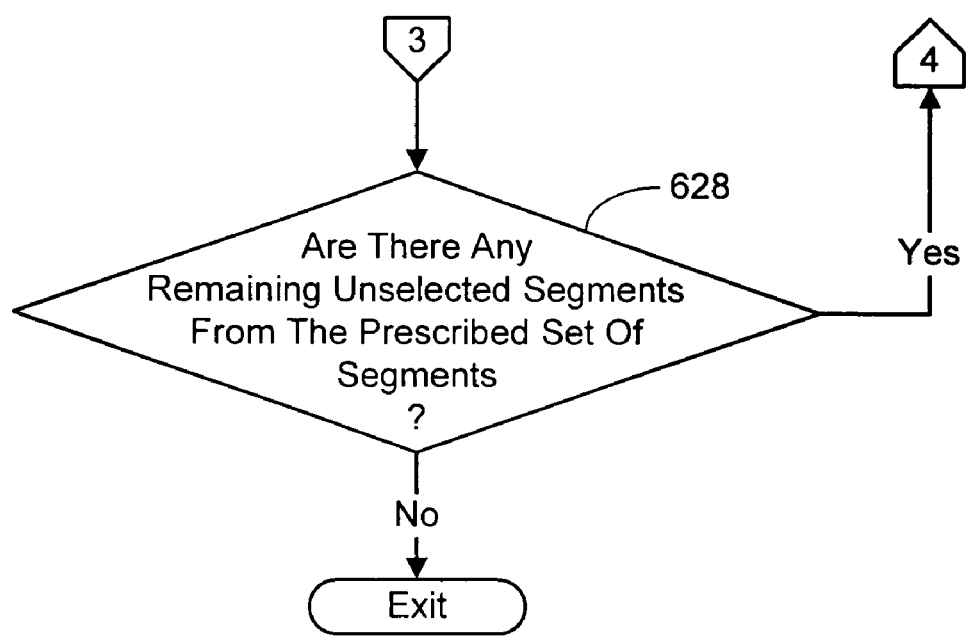

To handle the foregoing situation, the procedure outlined in FIGS. 6A-C can be employed. First, for every segment in the image under consideration a corresponding segment is found in the other image in the sequence, if possible, and flow vectors are computed between the corresponding segments using the aforementioned centroid technique, just as described previously. More particularly, a previously unselected segment in the image under consideration is selected (process action 600) and a segment in the other image that corresponds to the selected segment is found (process action 602). The flow vector that describes the translation between the positions of the centroids of the corresponding segments is then computed (process action 604). It is next determined if there are any remaining unselected segments in the image under consideration (process action 606). If so, process actions 600 through 606 are repeated. When a flow vector is computed for every pair of corresponding segments between the two images, the process continues by checking each flow vector against the flow vectors computed for segments in the image under consideration that surround (i.e., which are immediately adjacent) the segment associated with the flow vector under consideration. Referring again to FIGS. 6A-C, in one embodiment of the present invention, this entails, selecting a previously unselected segment of the image under consideration chosen from a prescribed set of segments (process action 608). The last-computed flow vector associated with the selected segment and the last-computed flow vectors of the segments in the image under consideration that reside immediately adjacent to the selected segment, are identified next (process action 610). A previously unselected one of these identified flow vectors is then selected (process action 612) as is a previously unselected pixel of the segment associated with the selected flow vector (process action 614). The selected pixel is projected into the other image and the corresponding pixel in that image is identified (process action 616). Next, the color difference between the selected pixel and its corresponding pixel in the other image is computed (process action 618). It is then determined if all the pixels of the segment associated with the selected flow vector have been selected (process action 620). If not, process actions 614 through 620 are repeated. When all the pixels of the segment being considered have been processed, an overall color difference based on the individual color differences computed for each projected pixel is computed (process action 622). This could be done by computing the sum of the difference in color between each corresponding pixel pair. It is next determined if there are any of the previously identified flow vectors that have not been selected (process action 624). If so, process actions 612 through 624 are repeated. When all the previously identified flow vectors have been considered, an overall color difference will have been computed for each of them. In process action 626, the flow vector associated with the smallest overall difference is assigned to the selected segment and designated as the refined optical flow estimate for the selected segment. It is noted that if the selected segment is partially occluded in the other image then the flow vector assigned may be one computed for a neighboring segment. It is next determined if there are any remaining unselected segments from the aforementioned prescribed set of segments (process action 628). If so, process actions 608 through 628 are repeated. If not, the process ends.

Figure 7:
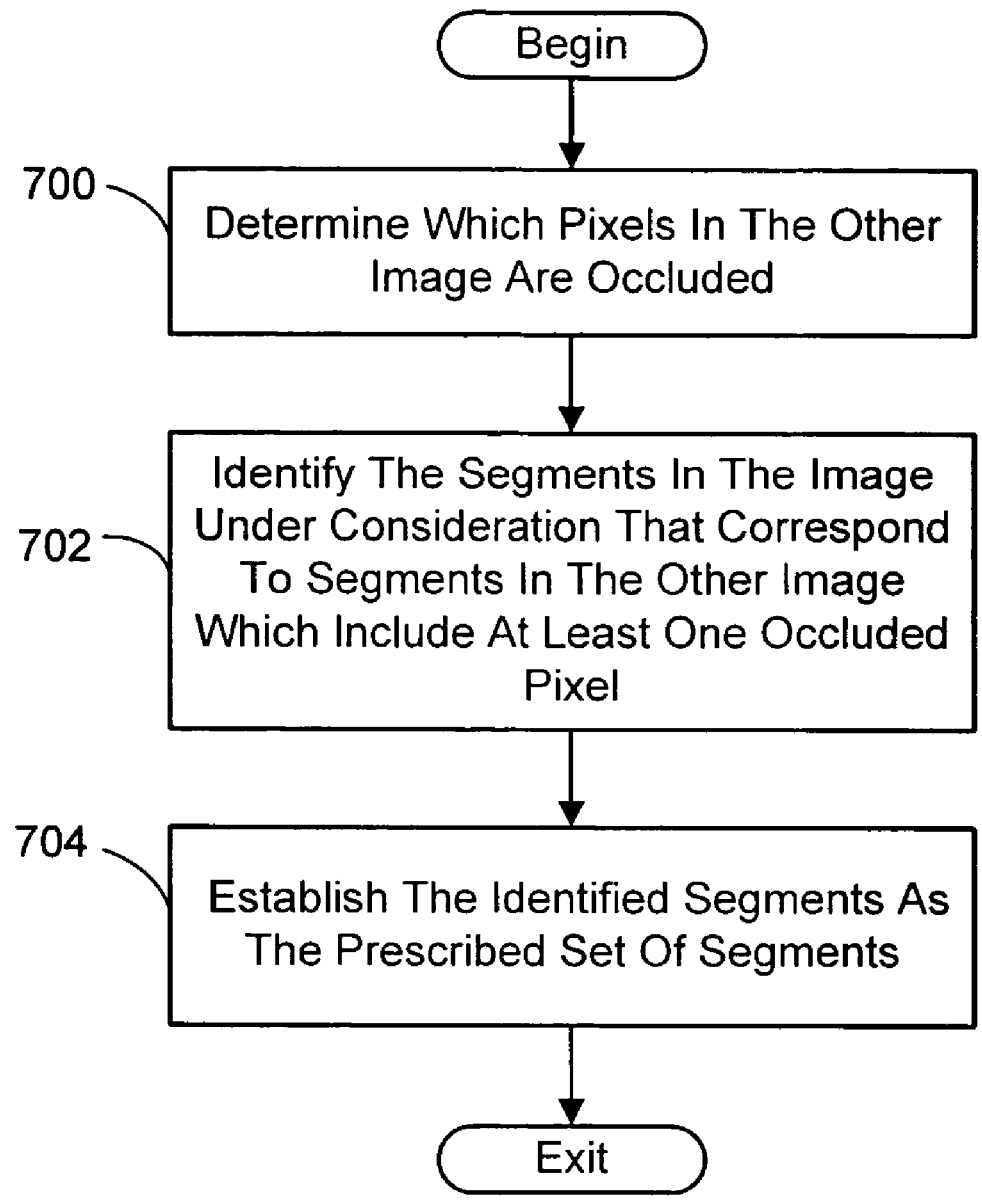
FIG. 7 is a flow chart diagramming a process for identifying segments in a neighboring image having occluded pixels according to one embodiment of the present invention, which is employed as part of a flow vector computation process.

The foregoing occlusion test procedure could be performed for every segment in the image under consideration. Thus, the aforementioned prescribed set of segments would include all those having a flow vector associated with it. However, alternately, to reduce processing expenses, a conventional technique could be employed to identify occluded pixels in the other image. Then, only those segments corresponding to a segment in the other image having occluded pixels in it would be tested in the above-described manner. More particularly, the aforementioned prescribed set of segments would be established, as shown in FIG. 7, by first determining which pixels in the other image are occluded (process action 700). The segments in the image under consideration that correspond to segments in the other image that include at least one occluded pixel are then identified (process action 702). And finally, in process action 704, the identified segments are established as the prescribed set of segments.

As indicated previously, it is possible that a segment in the image under consideration will not be assigned a corresponding segment in the other image, thereby making it impossible to compute a flow vector for that segment. There could be several reasons that a corresponding segment is not found. For example, this situation could occur due to noise in the pixel values, a significant number of occluded pixels in the corresponding segment in the other image, or when the part of the scene depicted in a segment in the image under consideration is no long depicted in the other image. In the case where a corresponding segment cannot be found, then a weighted average flow is computed for the segment as described in Eq. (5), and this is assigned to the segment as its flow vector.

3.0 Optical Flow Estimation and Image Segmentation for a Sequence of Images

Figure 8:
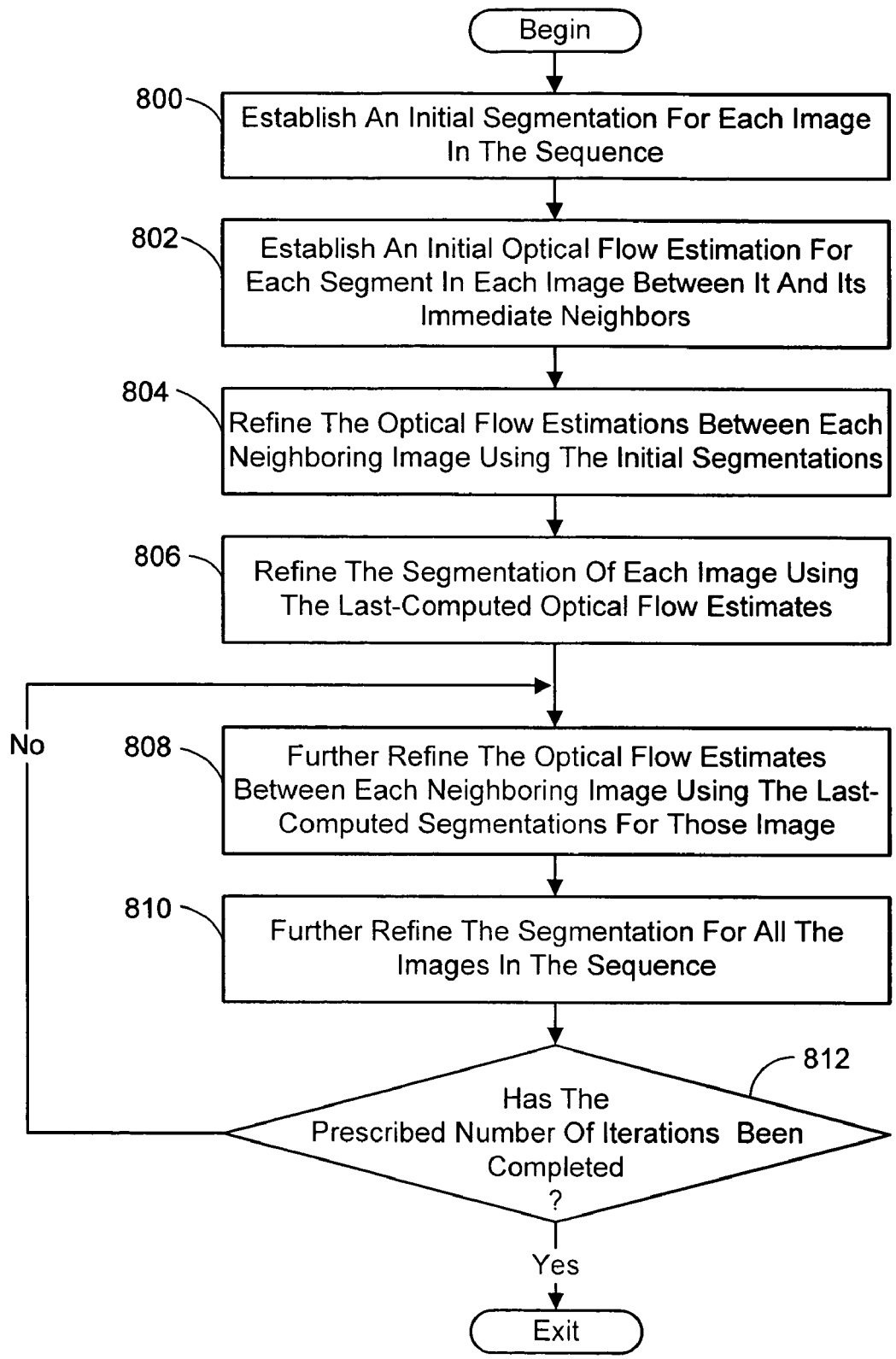
FIG. 8 is a flow chart diagramming a process for segmenting and estimating optical flow between three or more images in a sequence of images of a scene according to the present invention.

As indicated previously, the foregoing technique applicable to a pair of images of a scene can be expanded to provide segmentation and bi-directional optical flow estimation for a longer sequence, such as for the sequential frames of a video. This is accomplished by performing the foregoing technique between sequential pair of images in the sequence in an iterative manner. In other words, referring to FIG. 8, first an initial segmentation would be established for each image in the sequence (process action 800), as well as an initial optical flow estimation for each segment in each image between it and its immediate neighbors (both the previous and subsequent image in the sequence when applicable) (process action 802). The optical flow estimations would then be refined between each neighboring image using the initial segmentations (process action 804), and then the segmentation of each image would be refined using the last-computed optical flow estimates (process action 806). If desired, the optical flow estimates between each neighboring image can be further refined using the last-computed segmentations for those images (process action 808), and then the segmentation can be further refined for all the images in the sequence (process action 810). These last two actions can be repeated, until a prescribed number of iterations have been completed (e.g., 30-50 iterations). More particularly, it is determined if the prescribed number of iterations has been completed (process action 812). If not, then process actions 808 through 812 are repeated. When the prescribed number of iterations has been reached, the process ends.

As for the processes used to establish the initial segmentation and optical flow estimates, and to refine them between each pair of images in the sequence afterwards, they are the same as those described previously, with slight modifications. With the exception of the first and last images in the sequence, all the other images will have both an immediately preceding and subsequent neighboring image. This fact can be used advantageously when finding a corresponding segment in a neighboring image. More particularly, the use of the aforementioned regularization factor can be expanded to consider both preceding and subsequent images. One way of accomplishing this is to modify Eq. (4) to include two regularization factors—one associated with the preceding image and one associated with the subsequent image in the sequence. Thus, $$e^{-(\Delta C)^2/\sigma_c^2} T(S_{i,k}, S_{j,l}) e^{-((-\Delta x_{prev}) - \bar{v}(S_{i,k}))^2/\sigma_{x_{prev}}^2} e^{-((\Delta x_{sub}) - \bar{v}(S_{i,k}))^2/\sigma_{x_{sub}}^2} \quad (6)$$

where $\Delta x_{prev}$ is the difference between the positions of the centroids of the corresponding segments between the image under consideration and its preceding neighbor image, $\sigma_{x_{prev}}$ is the estimated standard deviation of the difference in the position of the centroids of the corresponding segments between the image under consideration and its preceding neighbor image, $\Delta x_{sub}$ is the difference between the positions of the centroids of the corresponding segments between the image under consideration and its subsequent neighbor image, and $\sigma_{x_{sub}}$ is the estimated standard deviation of the difference in the position of the centroids of the corresponding segments between the image under consideration and its subsequent neighbor image.

In addition, while one or the other of the neighboring images immediately preceding and following an image being segmented could be selected to compute the previously described second scoring component, using both can improve the results. This can be accomplished when determining which main and possible secondary segment that each pixel belongs to by generating a second scoring component that is derived using both the neighboring images. More particularly, for each pixel of the image being segmented, it is projected into each of the neighboring images using the appropriate flow vector. The appropriate flow vector is the one computed between the image being segmented and the neighboring image under consideration for the segment that the pixel has as its current candidate main segment. For each of the neighboring images, it is then determined how many pixels in a prescribed sized neighborhood surrounding the projected location of the pixel have as their main segments a segment that corresponds to one of the pair of candidate segments under consideration in the image being segmented. These numbers are designated as the second scoring component, and are used as described previously to determine which of the candidate pairs is designated as the main and secondary segments for the pixel. Mathematically, this modified process involves maximizing the following equation for the selected pixel and all the pairs of candidate main and secondary segments:

$$e^{-R(p, S_{i,k}, S_{i,l})^2/\sigma_s^2} N(p, S_{i,k'}) N'(p, S_{j,k'})_{prev} N'(p, S_{j,k'})_{sub} \quad (7)$$

where $N'(p, S_{j,k'})_{prev}$ is the part of the second scoring component attributable to the neighboring image preceding the image being segmented, and $N'(p, S_{j,k'})_{sub}$ is the part of the second scoring component attributable neighboring image following the image being segmented.

4.0 Theoretical Basis and Operation

The following sections describe the theoretical basis for the foregoing simultaneous optical flow estimation and image segmentation technique and describe its operation in more detail. In general, the present technique is based on generative modeling on a pair of images using appearance and motion constraints. Segments are explicitly modeled as overlapping regions with fractional ($\alpha$) contributions. Motion is bidirectional, and is estimated based on spatial coherence and similarity of segment colors. The generative model is extended to video by chaining the pairwise models together in the form of a factor graph. For inference, many approaches are possible such as belief propagation or variational methods. To make the problem more tractable, the posterior distribution is factorized and its parts are iteratively minimized using a variational approach.

4.1 Overlapping Segments as a Generative Model of a Single Image

Each image is considered as being composed of multiple segments (to be determined jointly with the segment motion, segment appearance, as well as other variables in the model). Each segment k has a distribution over the pixel colors and coordinates described by parameters $\phi_k$. In experiments, the Gaussian model described by the mean $\mu_k$ and covariance matrix $\Sigma_k$, for the segment's color distribution. The Gaussain model was used with mean $\eta_k$ and covariance matrix $\Delta_k$ to describe the spatial distribution of the segment's pixels. Therefore, the parameters describing the color and coordinate variation in the segment are given by $\phi_k = (\mu_k, \Sigma_k, \eta_k, \Delta_k)$. Other possible parameterizations of the probabilistic constraints on the segment's shape and appearance include mixtures of Gaussians, color histograms, feature mixtures, or image patch mixtures.

The segment parameters describe the extent of the within-segment pixel similarity and variability. In addition to this generalized description, the segments also have their realization in the image, which could be defined, for example, by the index map S={$s_i | s_i \in \{1, \ldots, K\}$}, where i denotes the pixel index, and $s_i$=k indicates that the i-th pixel belongs to the k-th segment. For each segment k, the particular realization of colors $c_{i,k}$ for the segment pixels was treated as hidden.

Treating the colors inside the segment as hidden enables modeling segment overlaps and alpha-blending of their boundaries when necessary. In particular, instead of a single index map {$s_i$}, two hidden segment indices $s_i^1$ and $s_i^2$ and a hidden alpha value $\alpha_i$, can be assigned to each pixel i, so that the actual observed color of the pixel is $c_i \approx \alpha_i c_{i,s_i^1} + (1-\alpha_i) c_{i,s_i^2}$. Since the model currently only treats boundaries between two segments, for each pixel i, there are only two possible hidden colors $c_{i,k}$, and so hereafter the following shorthand notation will be used, i.e., $c_i^1 = c_{i,s_i^1}$, $c_i^2 = c_{i,s_i^2}$. Note that the pixels that are not on the boundary are captured by the case $s_i^1 = s_i^2$.

This parameterization of the variability in the data corresponds to a generative model of a single image, which generates pixel colors and positions $c_i = [r_i, g_i, b_i]^T$, $r_i = [x_i, y_i]^T$ for i=1, ..., I, by the following hierarchical process. First, hidden index pairs ($s_i^1$, $s_i^2$) are sampled from a uniform distribution. Then, two hidden pixel colors $c_i^1, c_i^2$ and positions $r_i^1$, $r_i^2$ are generated with the assumption that both hidden positions are observed, i.e., $r_i^1 = r_i^2 = r_i$. Then, the alpha value $\alpha_i$ is generated from a prior distribution (either uniform or the one favoring $\alpha=0$ or $\alpha=1$). The generative process ends by generating the observed pixel color $c_i$ by a noisy alpha-blending of the two parent pixel colors $c_i^1$ and $c_2$. Note again that non-boundary pixels would simply have the two hidden parents belonging to the same segment.

Figure 9:
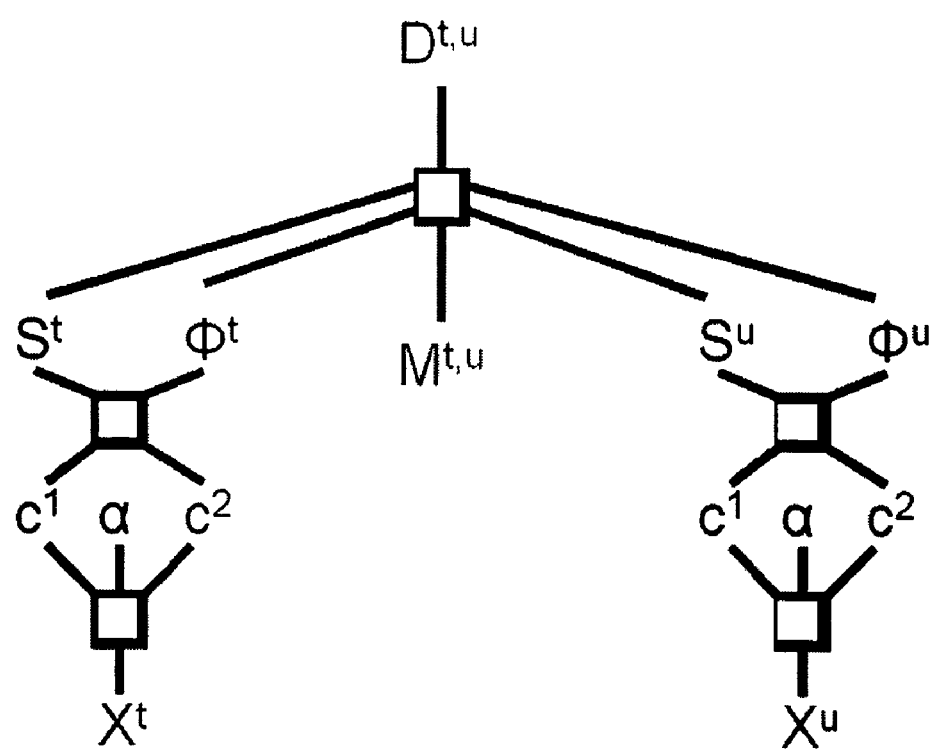
FIG. 9 is a diagram of a corresponding factor graph representing the generative model of an image having overlapping segments expressed in terms of multiplicative factors.

Since constraints that impose consistent segmentation of a sequence of images will be introduced shortly, instead of the usual parameterization of a generative model in the form of a product of conditional distributions, it is more expressive to describe the model in terms of its multiplicative factors, which have a corresponding factor graph as shown in FIG. 9.

The first set of distributions in the generative model would correspond to the priors $$p(s_i^1) = p(s_i^2) = 1/K, \quad (8)$$

but since they are constant, these factors would have no influence on the inference in the factor graph, so can be omitted whenever it leads to more compact equations.

The following pair of factors for each pixel i correspond to the conditional distribution over the two hidden pixel colors $c_i^1$, $c_i^2$ and positions $r_i^1$, $r_i^2$ given the segment indices $s_i^1$, $s_i^2$:

$$p(c_i^1, r_i^1 | s_i^1, \phi_{s_i^1}) = N(c_i^1; \mu_{s_i^1}, \Sigma_{s_i^1}) N(r_i^1; \eta_{s_i^1}, \Delta_{s_i^1})$$

$$p(c_i^2, r_i^2 | s_i^2, \phi_{s_i^2}) = N(c_i^2; \mu_{s_i^2}^c, \Sigma_{s_i^2}) N(r_i^2; \eta_{s_i^2}, \Delta_{s_i^2}).$$

Note that the two hidden parent pixels from two different segments $s_i^1$, $s_i^2$ were introduced in order to allow for the blending of the two possibly different segment colors, but the actual coordinates of the hidden pixels are assumed to both be observed as the actual coordinate of the i-the pixel, i.e., $r_i^1 = r_i^2 = r_i$. The alpha-blending is captured in the last factor of this model, $$p(c_i | c_i^1, c_i^2, \alpha_i) = N_i(c_i; \alpha_i c_i^1 + (1-\alpha_i) c_i^2, \psi). \quad (9)$$

The prior on $\alpha$ is constructed to favor values close to one, and this is expressed through normalized factors $p(\alpha_i)$.

If it is assumed that the observations defining the image X are the pixel colors $c_i$ and coordinates $r_i^1$, $r_i^2$ (with the latter two being the same, i.e., $r_i^1 = r_i^2 = r_i$), of all pixels, then the product of all factors is in fact a normalized distribution $$p(\{c_i, c_i^1, c_i^2, r_i^1, r_i^2, s_i^1, s_i^2\}_{i=1}^I) =$$

$$\prod_i p(s_i^1) p(s_i^2) p(\alpha_i) p(c_i^1, r_i^1 | s_i^1) p(c_i^2, r_i^2 | s_i^2) p(c_i | c_i^1, c_i^2, \alpha_i).$$

A method that jointly segments the data and learns the parameters $\psi, \{\phi_k\}_{k=1}^K$, can be developed using either the exact expectation maximization (EM), or a faster variational version. For any given image, the exact posterior over the hidden variables in the model has the form $Q = \Pi_i q(s_i^1, s_i^2) q(c_i^1, c_i^2 | s_i^1, s_i^2)$. By minimizing the free energy of the model $F = \Sigma_{s_i^1, s_i^2} \int_{c_i^1, c_i^2} Q \log Q - Q \log P$, both approximate inference and learning can be performed. It is well known that the likelihood of the image (after integrating out hidden variables) is bounded by the negative free energy, i.e., log $p(X) \geq -F$. Thus, iterative minimization of F with respect to the parameters of the Q distribution and the parameters of the P distribution is guaranteed to converge to a local minimum of the free energy, whose negative is a lower bound on the log likelihood of the data for the resulting parameters of P. In this case, since the exact form of the posterior is being used, the bound will be tight, and the inference and learning are equivalent to Bayesian inference and the exact EM algorithm.

However, once new constrains are introduced among segments in a pair of images, the above form of the Q function for the hidden variables in one image will no longer be exact, and inference and learning will become variational.

4.2 Modeling an Image Pair

Next, a statistical model of a pair of images with corresponding segments is considered. Such image pairs can be found, for example, in a video sequence, a collection of photographs of the same (possibly dynamic) scene, or even in a collection of photographs or video sequences containing similar objects. While the modeling paradigm developed here is rather general, the focus for exemplary purposes is on closely matching image pairs, leading to applications in motion analysis.

An image pair is denoted by $X^t$ and $X^u$. Also, superscripts $^t$ and $^u$ will be used to differentiate between the hidden variables associated with $X^t$ and $X^u$

4.2.1 Segment Mapping Variables

The segment correspondence is defined by two mappings. First, the mapping $M^{tu}$ of segments describing $X^t$ to the segments describing $X^u$, and second, the mapping $M^{ut}$ of segments describing $X^u$ to the segments describing $X^t$. The two mapping should be mostly consistent, but given that certain pieces of scene could disappear from one image to the next (especially in dynamic scenes), and that one image may be oversegmented in a certain region, the deviations from 1-1 correspondence have to be allowed. In addition, the optimal 1-1 segment matching is an NP-hard problem and the use of dual maps increases the robustness of the approximate inference (reduces local minima problems).

Each mapping is defined by a set of variables $M = \{m_k\}_{k=1}^K$, one for each segment k, which point to the corresponding segment in the other image. For example, $m_k^{tu} = j$ indicates that the k-th segment of the image $X^t$ corresponds to the j-th segment of $X^u$. By symmetry, in this example it would be expected that $m_j^{ut} = k$, which was found to be most often the case, but the flexibility of allowing $m_{m_k^{tu}}^{ut} \neq k$ is important for modeling occlusion and disocclusion events in sequences, as well as matching photographs in which many segments may need to remain unmatched. Properly capturing image motion around occlusion boundaries is the most important problem in dense motion estimation today.

In the present model it is insisted that each segment k has a mapping in the other image, for example $m_k^{tu} \in \{1, \ldots, K^u\}$, where $K^u$ is the number of segments in the generative model of $X^u$.

4.2.2 Segment Displacement Variables

In addition to the mapping variables, a bi-directional displacement field (flow) is also defined between the pixels in two images. The displacement field $D^{tu}=\{d_k^{tu}\}$ is defined as a set of flow vectors for each segment k in the image $X^t$. The actual dense image flow is constructed by assigning to each pixel the flow associated with its segment. Similarly, define the flow as $D^{ut}=\{d_l^{ut}\}$, and it would be expected that most of the time $\eta_k^t + d_k^{tu} = \eta_{m_k^{tu}}^u$ and $\eta_{m_k^{tu}}^u + d_{m_k^{tu}}^{ut} = \eta_k^t$. However, deviations from this are allowed in order to deal with partial or total occlusion of segments. The k-th segment of $X^t$ can be mapped to the l-th segment in $X^u$ according to $M^{tu}$, but some part of segment l may be occluded by another object, and so the flow in $D^{tu}$ may deviate from the difference between the segments' spatial means.

Having introduced new variables, the new constraints needed to properly capture correlations among variables describing a pair of images need to be explored. As before, these constraints are expressed in terms of factors whose product defines the optimization criterion to be optimized using variational inference. Each factor is a function of the subset of the variables in the model.

4.2.3 Constraints on the Variables of an Image Pair

Matching segments should be good predictors of one another, and this is expressed through additional factors linking the hidden variables of $X^t$ and $X^u$.

The mean colors of the segments should be close to each other, which can be expressed by Gaussian factors for segments of image $X^t$ of the form $$f_k^{tu} = N(\mu_k^t; \mu_{m_k^{tu}}^u, \psi^{tu}), \tag{10}$$

and analogous factors $f_l^{ut}$ for the segments of the image $X^u$.

In addition to enforcing consistent colors of the segments, constraints on the segmentation maps $S^{1,t}=\{s_i^{1,t}\}$, $S^{2,t}=\{s_i^{2,t}\}$, $S^{2,u}=\{s_j^{2,u}\}$, $S^{2,u}=\{s_j^{2,u}\}$ are also introduced in terms of multiplicative factors applying to a single image $$h_i^t = \Pi_{\epsilon_j^{i}d}(\epsilon[s_i^{1,t} \neq s_j^{1,t}] + (1-\epsilon)[s_i^{1,t}=s_j^{1,t}]) \times$$

$$\times \Pi_{\epsilon_j^{i}d}(\epsilon[s_i^{2,t} \neq s_j^{1,t}] + (1-\epsilon)[s_i^{2,t}=s_j^{1,t}]),$$

and multiplicative factors applying to the image pair, $$h_i^{tu} = \prod_{j \in \varepsilon_{r_i^t + d_i^{tu}}} (\varepsilon[s_j^{1,u} \neq m_i^{tu}(s_i^{1,t})] + (1-\varepsilon)[s_j^{1,u} = m^{tu}(s_i^{1,t})]) \times$$

$$\prod_{j \in \varepsilon_{r_i^t + d_i^{tu}}} (\varepsilon[s_j^{2,u} \neq m_i^{tu}(s_i^{1,t})] + (1-\varepsilon)[s_j^{1,u} = m^{tu}(s_i^{1,t})]),$$

where $\epsilon_{r_i^t=d_i^{tu}}$ denotes a small neighborhood around the pixel with coordinates $r_i^t + d_i^{tu}$ in image $X^u$. In the introduced notation, $r_i^t + d_i^{tu}$ denotes the coordinates to which the i-th pixel is going to move according to the displacement field $D^{tu}$.

These sets of constraints favor consistent segmentation within and across images, with the second sets of factors $h_i^{tu}$, and $h_j^{ut}$ favoring the preservation of the segment shapes as they get displaced from one image to the next. Again, the segment index pair $s^1$, $s^2$ receives an asymmetric treatment, with the first index being the primary one, and the second index being only influenced by the assignment of the first one in the matching neighborhood.

Finally, two sets of constraints on the displacement fields $D^{tu}$ and $D^{ut}$ are also included. The first one is a hard constraint enforcing the segment flows to be equal to one of the differences between the matching segments' spatial means:

$$g_k^t = 1 - \prod_{n \in \varepsilon_k} (1 - [d_k^{tu} = \eta_n^t - \eta_{m_n^u}^u]), \tag{11}$$

where $\epsilon_k$ is defined as the set of all segments in the neighborhood of k. More specifically, this neighborhood includes each segment n which has at least one pixel i in the neighborhood of $\eta_k^t$ for which $s_i^t=n$. This hard constraint regularizes the mapping and displacement estimation, while still allowing some deviation of the segments flow from the flow to the mean of the matching segment (instead, the segment can assume a flow vector of one of the nearby segments, thus dealing better with shrinking segments which may throw off the estimation of the matching segment's mean).

The second set of constraints on the displacement field enforces the smoothness and consistency of the bidirectional flows:

$$g_k^{t,u} = \prod_{n \in \varepsilon_k} N(d_k^{tu}, d_n^{tu}, \delta) N(d_k^{tu}, -d_{m_n^{tu}}^{ut} \delta) \tag{12}$$

In a single factor, all the constraints between the sets of hidden variables and parameters associated with individual images can be expressed as:

$$f^{t,u} = \left( \prod_{k=1}^{K^t} f_k^{tu} g_k^t g_k^{tu} \right) \left( \prod_{l=1}^{K^u} f_l^{ut} g_l^u g_l^{ut} \right) \left( \prod_{i=1}^{I^t} h_i^t h_i^{tu} \right) \left( \prod_{j=1}^{I^u} h_j^u h_j^{ut} \right),$$

where $K^t$ denotes the number of segments of image $X^t$, while $I^t$ denotes the number of pixels in the image. Similar notation is used for the parts of the other image, $X^u$.

The probability distribution over all the variables describing the image pair is then expressed as $$P = \frac{1}{Z} p^t f^{t,u} p^u, \tag{13}$$

where Z is the normalization constant, and $p^t$ and $p^u$ are the generative models of individual images defined by overlapping segments as in the previous section.

4.3 Modeling a Sequence of Images

A straightforward extension of the image pair model is the following joint probability distribution, $$P = \frac{1}{Z} \prod_t p^t f^{t,t+1}, \tag{14}$$

obtained by chaining the model of Eq. (11). Note, however, that the model can be made stronger by adding terms connecting distant frames as well, e.g., $$P = \frac{1}{Z}\prod_t p^t \prod_{\Delta t} f^{t,t+\Delta t}. \quad (15)$$

The former parameterization was used in tested embodiments for computational efficiency reasons.

4.4 Inference

In the preceding model specification, a number of hidden variables and parameters were introduced. In the variational formulation, the distinction between parameters and variables is blurred, since parameters can always be treated as variables. However, a deterministic posterior can be used for them. In this way, generalized EM learning is not different from variational inference, with both being iterative algorithms with guarantees on convergence and certain types of local optimality It can be shown that the normalization constant Z is a function only on the segmentation consistency parameter $\epsilon$ which controls the Markov random field on segment indices S, and possibly inter-image color noise covariance matrices $\psi$. In the case of the simple chain model of a video sequence which was used in tested embodiment of the present invention, the last dependency is also lost (the appropriate integral is one), and the result is $$Z=Z(\epsilon). \quad (16)$$

Therefore, learning $\epsilon$ would be difficult. However, it turns out that the learning and inference of other parameters and variables is fairly robust to the variation in $\epsilon$, and so it can be preset to a value found to work well for a variety of image sequences.

Inference is based on minimizing the free energy $$F=\int_H Q \log Q - \int_H Q \log P, \quad (17)$$

which is the lower bound on the likelihood of the data $\int_H P$, with P given by Eq. (12). The form of the approximate posterior over the hidden variables Q(H) is chosen so as to speed up the inference while keeping as much of needed uncertainty and correlation among hidden variables. It was found that the following factorization of Q is particularly useful:

$$Q = \prod_t \prod_{i=1}^{I^t} (q(s_i^{1,t}, s_i^{2,t})q(c_i^{1,t}, c_i^{2,t} \mid s_i^{1,t}, s_i^{2,t})q(\alpha_i^t)) \times$$

$$\prod_t \prod_{k=1}^{K^t} q(m_k^{t,t-1}, d_k^{t,t-1})q(m_k^{t,t+1}, d_k^{t,t+1})$$

By using this form of Q, the free energy reduces to many additive terms, and each factor of Q, and each parameter of P is only influencing a small number of these additive terms. Thus minimization of F with respect to either individual distributions in Q or parameters of P can be done efficiently if all other parts of Q and P are kept fixed. Iterating these minimizations leads to reduction in free energy in each step.

Some of the factors in the Q distribution have a constrained form. The distribution over hidden blended colors for each pixel $q(c_i^{1,t}, c_i^{2,t} \mid s_i^{1,t}, s_i^{2,t})$ is expressed by a Gaussian distribution, which is the form the exact posterior has, too, when $\alpha_i$ is given. The posterior distributions over the matting variables are expressed by Dirac functions $q(\alpha_i^t)=\delta(\alpha_i^t-\hat{\alpha}_i^t)$. The distribution $q(s_i^{1,t}, s_i^{2,t})$ is fully expressive in principle, it is a $K^t \times K^t$ table of probabilities that add up to one), but some entries in the table are forced to be zero to speed up the search for $q(s_i^{1,t}, S_i^{2,t})$ that reduces the free energy. In particular, the columns and rows corresponding to the segments which have been far away from the i-th pixel during learning, are zeroed. It is noted that the images are over-segmented into several hundred segments to finely represent image motion, but each pixel has only a handful of segments that are likely to be its parents in any iteration of variational learning.

Finally, the posterior over the mapping and displacement is assumed to be deterministic (or Dirac, which is in accordance with the hard constraints on the deformation field $g_i^t$), $q(m_k^{t,u}, d_k^{t,u})=[m_k^{t,u}=\hat{m}_k^{t,u}]\delta(d_k^{t,u}-\hat{d}_k^{t,u})$. The update on each of these posterior reduces to searching for the mapping $\hat{m}_k^{t,u}$ which reduces the free energy the most while setting the displacement $\hat{d}_k^{t,u}$ to either the new segment displacement for this mapping, or to one of the old displacements of the segments in the neighborhood (which ever reduces F more).

The free energy F is iteratively reduced with respect to the parameters of P and Q until convergence, at which point the displacements $\hat{d}_k^{t,u}$ define the uniform flow field useful for a variety of applications, such as frame interpolation, object segmentation, and others.

Wherefore, what is claimed is:

1. A computer-implemented process for segmenting and estimating the optical flow between a pair of images of a scene, comprising using a computer to perform the to following process actions:

establishing an initial segmentation for each image;

establishing an initial optical flow estimate for each segment of each image, wherein the optical flow estimate is the estimate of a translation that describes any movement of the segment from a position in one of the images to a position of the segment as seen in the other image;

computing a refined optical flow estimate for each segment of a first one of the images from the initial segmentation of that image and the initial optical flow of the segments of that image;

computing a refined optical flow estimate for each segment of the second image from the initial segmentation of that image and the initial optical flow of the segments of that image;

refining the segmentation of the first image from the last-computed optical flow estimates for each segment of the first image;

refining the segmentation of the second image from the last-computed optical flow estimates for each segment of the second image;

further refining the optical flow estimates for each segment of the first image from the last-computed segmentation of the first image;

further refining the optical flow estimates for each segment of the second image from the last-computed segmentation of the second image; and iteratively repeating process actions of refining of the segmentation of the images followed by the process actions of refining the optical flow estimates for each segment of the images until a prescribed number of iterations have been completed, wherein, all of the pixels of the images are assigned to a main segment in that image, and except in the initial segmentation, those pixels of the images that contribute color to a lesser extent to a second segment in that image are also assigned to a secondary segment, and the process actions of refining the segmentation of the images from the last-computed optical flow estimates for each segment of that image, comprise the actions of, for every pixel in each image, identifying the segments having pixels which fall within a prescribed-sized pixel neighborhood surrounding the pixel under consideration using the last-computed segmentation of the image as a basis, designating as candidate segments those identified segments which are the main segment for a pixel in the pixel neighborhood, whenever more than one segment is designated as a candidate segment for a pixel under consideration, identifying a winning pair of candidate segments which represent the closest in color and physical distance to the pixel under consideration, computing an alpha value for the pixel under consideration which represents the percentage of the color of the pixel contributed to the segment of the winning pair which is closest in color to the pixel and assigning the alpha value to the pixel, assigning the pixel under consideration to the segment of the winning pair which is closest in color to the pixel and designating the segment as the pixel's main segment, and assigning the pixel under consideration to the other segment of the winning pair which is not the closest in color to the pixel and designating the other segment as the pixel's secondary segment, and whenever only one segment is designated as a candidate segment for a pixel under consideration, assigning the pixel under consideration to the segment and designating the segment to be the pixel's main segment, and assigning an alpha value of 1 to the pixel under consideration.

2. The process of claim 1, wherein the process action of identifying the winning pair of candidate segments, comprises the actions of:

for each possible pair of candidate segments, determining how many pixels in a second prescribed-sized neighborhood around the pixel under consideration have either of tie pair of candidate segments under consideration as a main segment and designating the number as a first scoring component, projecting the pixel under consideration into the other image using the last-computed flow estimate for the segment that the pixel has as its main segment, determining how many pixels in a third prescribed sized neighborhood surrounding the projected location of the pixel under consideration in the other image have as their main segments a segment that corresponds to one of the pair of candidate segments under consideration in the image being re-segmented, and designating the number as a second scoring component, computing an alpha similarity factor for the pixel and candidate segment pair under consideration, wherein the alpha similarity factor represents how close the pixel color is to an alpha blended color of the candidate segment pair, and multiplying the first and second scoring components and the alpha similarity factor, and designating the result to be an overall score for the candidate segment pair under consideration; and designating the candidate segment pair with the highest overall score as the winning pair.

3. The process of claim 2, further comprising performing a process action of dividing the product of the first and second scoring components and the alpha similarity factor, by the number of pixels in the segment of the candidate segment pair under consideration which is closest in color to the pixel under consideration, prior to designating the result to be the overall score for the candidate segment pair.

4. The process of claim 1, wherein the process actions of refining the optical flow estimates for each segment of the images, comprises, for each image, the actions of:

finding a corresponding segment in the other image; and computing an optical flow vector which represents the translation between the position of the centroid of the segment under consideration in the image under consideration and the centroid of the corresponding segment in the other image.

5. The process of claim 4, wherein the process action of finding the corresponding segment in the other image, comprises the actions of:

for each segment in the other frame, computing a color similarity factor representing how close in color the segment in the image under consideration is to the segment under consideration in the other image, computing a segment size similarity factor representing how close in size the segment in the image under consideration is to the segment under consideration in the other image, computing a regularization factor representing how consistent the optical flow between the segment in the image under consideration and the segment under consideration in the other image is to optical flow associated with other segments in the image under consideration, multiplying the color similarity, segment size similarity and regularization factors to produce an overall similarity score for the segment in the image under consideration and the segment under consideration in the other image; and identifying the segment in the other image associated with the highest overall similarity score and designating it as the corresponding segment to the segment under consideration in the image under consideration.

6. The process of claim 4, wherein the process action of finding the corresponding segment in the other image in the sequence, comprises the actions of:

for each segment in the other frame, computing a color similarity factor representing how close in color the segment in the image under consideration is to the segment under consideration in the other image, computing a segment size similarity factor representing how close in size the segment in the image under consideration is to the segment under consideration in the other image, computing a regularization factor representing how consistent the optical flow between the segment in the image under consideration and the segment under consideration in the other image is to optical flow associated with other segments in the image under consideration, multiplying the color similarity, segment size similarity and regularization factors to produce an overall similarity score for the segment in the image under consideration and the segment under consideration in the other image;

determining if the highest overall similarity score produced exceeds a prescribed minimum similarly threshold; and whenever the highest overall similarity score produced exceeds the prescribed minimum similarity threshold, identifying the segment in the other image associated with the highest overall similarity score and designating it as the corresponding segment to the segment under consideration in the image under consideration.

7. The process of claim 1 wherein the process actions of refining the optical flow estimates for each segment of the images, comprise, for each image, the actions of:

finding a corresponding segment in the other image for each segment in the image under consideration, computing an optical flow vector which represents the translation between the position of the centroid of the segment under consideration in the image under consideration and the centroid of the corresponding segment in the other image for each segment in the image under consideration; and for each of a set of the segments in the image under consideration, using the optical flow vector computed for each segment in the image under consideration that are immediately adjacent the segment under consideration and the flow vector computed for the segment under consideration, projecting each pixel of the segment under consideration into the other image, for each projected pixel, identifying the pixel in said other image that approximately corresponds in location to the projected pixel and computing a color difference between the projected pixel and said correspondingly located pixel in the other image, computing an overall color difference based on the individual color differences computed for each projected pixel, and establishing the optical flow vector associated with the smallest overall color difference as the refined optical flow estimate for the segment under consideration.

8. The process of claim 7, wherein the set of the segments in the image under consideration comprises all the segments in the image.

9. The process of claim 7, further comprising, once the process action of computing an optical flow vector for each segment in the image under consideration is completed, an action of establishing the set of the segments in the image, said establishing action comprising:

determining which pixels in the other image are occluded;

identifying the segments in the image under consideration that correspond to segments in the other image that include at least one occluded pixel; and establishing the identified segments as the set of segments in the image under consideration.

10. A computer-readable storage medium having computer-executable instructions stored thereon for performing the process actions recited in claim 1.

11. A system for segmenting and estimating the optical flow between a first image and a second image of a scene, comprising:

a general purpose computing device; and a computer program comprising program modules executable by the computing device, wherein the computing device is directed by the program modules of the computer program to, compute an initial segmentation for each image, wherein each segment comprises a plurality of pixels, compute an initial optical flow estimate for each segment of the first image, said computation comprising for each segment of the first image computing a single optical flow vector based on a centroid of the segment of the first image, wherein the single vector represents an estimate of a translation between a position of the centroid of the segment of the first image to a position of the centroid of the segment as seen in the second image, compute an initial optical flow estimate for each segment of the second image, said computation comprising for each segment of the second image computing a single optical flow vector based on a centroid of the segment of the second image, wherein the single vector represents an estimate of a translation between a position of the centroid of the segment of the second image to a position of the centroid of the segment as seen in the first image, compute a refined segmentation of the first image wherein refined segments are computed from the initial optical flow estimates for each segment of the first image, and compute a refined segmentation of the second image wherein refined segments are computed from the initial optical flow estimates for each segment of the second image.

12. The system of claim 11, further comprising program modules for refining the optical flow estimates for each segment of the first image from the last-computed segmentation of the first image; and refining the optical flow estimates for each segment of the second image from the last-computed segmentation of the second image, wherein, the process actions of refining the optical flow estimates for each segment of the images, comprise, for each image, the actions of, finding a corresponding segment in the other image, and computing a single optical flow vector based on a centroid of the segment wherein the single vector represents the translation between the position of the centroid of the segment under consideration in the image under consideration and the centroid of the corresponding segment in the other image.

13. The system of claim 12, further comprising program modules for:

further refining the segmentation of the first image from the last-computed optical flow estimates for each segment of the first image;

further refining the segmentation of the second image from the last-computed optical flow estimates for each segment of the second image;

iteratively repeating the execution of the program modules for refining of the optical flow estimates for each segment of the images followed by refining the segmentation of the images until a prescribed number of iterations have been completed.

14. A computer-implemented process for segmenting and estimating the optics flow between a sequence of three or more images of a scene, comprising using a computer to perform the following process actions:

(a) computing an initial segmentation of each image in the sequence, wherein each segment comprises a plurality of pixels;

(b) computing an initial optical flow estimate for each segment in each image between it and its neighboring image or images, said computation comprising computing a single optical flow vector based on a centroid of the segment, wherein the single vector represents an estimate of a translation between a position of the centroid of the segment in said image to a position of the centroid of the segment as seen in its neighboring image or images;

(c) computing a refined optical flow estimate for each segment of each image between it and its neighboring image or images from the initial segmentation of the image and the initial optical flow of the segments of the image, wherein said computation comprises, for each image, the sub-actions of, (c1) finding a corresponding segment in the neighboring image or images for each segment in the image under consideration, and (c2) computing a single optical flow vector based on a centroid of the segment under consideration in the image under consideration, wherein the single vector represents the translation between the position of said centroid and the centroid of the corresponding segment in the neighboring image or images for each segment in the image under consideration;

(d) computing a refined segmentation for each image in the sequence from the last-computed optical flow estimates for the segments of the image;

(e) computing a further refined optical flow estimate for each segment of each image between it and its neighboring image or images horn the last-computed segmentation of the image, wherein said computation comprises, for each image, repeating sub-actions (c1) and (c2);

(f) computing a further refined segmentation for each image in the sequence from the last-computed optical flow estimates for the segments of the image; and (g) repeating actions (e) and (f) until a prescribed number of repetitions have been completed.

\* \* \* \* \*

UNITED STATES PATENT AND TRADEMARK OFFICE
CERTIFICATE OF CORRECTION

| | | |
|---|---|---|
| PATENT NO. | : 7,522,749 B2 | Page 1 of 1 |
| APPLICATION NO. | : 11/193273 | |
| DATED | : April 21, 2009 | |
| INVENTOR(S) | : Charles Zitnick, III et al. | |

It is certified that error appears in the above-identified patent and that said Letters Patent is hereby corrected as shown below:

In column 16, line 29, after "attributable" insert -- to the --.

In column 22, line 32, in Claim 1, after "the" delete "to".

In column 23, line 46, in Claim 2, delete "tie" and insert -- the --, therefor.

In column 25, line 5, in Claim 6, delete "similarly" and insert -- similarity --, therefor.

In column 25, line 17, in Claim 7, delete "consideration," and insert -- consideration; --, therefor.

In column 25, line 34, in Claim 7, delete "pixel" and insert -- pixel, --, therefor.

In column 26, line 30, in Claim 12, delete "for" and insert -- for: --, therefor.

In column 26, line 43, in Claim 12, delete "segment" and insert -- segment, --, therefor.

In column 26, line 62, in Claim 14, delete "optics" and insert -- optical --, therefor.

In column 28, line 11, in Claim 14, delete "horn" and insert -- from --, therefor.

Signed and Sealed this
Third Day of May, 2011

David J. Kappos
*Director of the United States Patent and Trademark Office*